United States Patent
Mizuno et al.

(10) Patent No.: US 9,348,704 B2
(45) Date of Patent: May 24, 2016

(54) ELECTRONIC STORAGE SYSTEM UTILIZING A PREDETERMINED FLAG FOR SUBSEQUENT PROCESSING OF EACH PREDETERMINED PORTION OF DATA REQUESTED TO BE STORED IN THE STORAGE SYSTEM

(71) Applicant: Hitachi, Ltd., Tokyo (JP)

(72) Inventors: Makio Mizuno, Tokyo (JP); Norio Shimozono, Tokyo (JP); Sadahiro Sugimoto, Tokyo (JP); Naoya Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/426,790

(22) PCT Filed: Dec. 24, 2013

(86) PCT No.: PCT/JP2013/084503
§ 371 (c)(1),
(2) Date: Mar. 9, 2015

(87) PCT Pub. No.: WO2015/097752
PCT Pub. Date: Jul. 2, 2015

(65) Prior Publication Data
US 2016/0026537 A1   Jan. 28, 2016

(51) Int. Cl.
*G06F 12/00* (2006.01)
*G06F 11/14* (2006.01)
*G06F 12/08* (2016.01)
*G06F 3/06* (2006.01)

(52) U.S. Cl.
CPC ............ *G06F 11/1451* (2013.01); *G06F 3/065* (2013.01); *G06F 3/0619* (2013.01); *G06F 3/0685* (2013.01); *G06F 12/0802* (2013.01); *G06F 2201/885* (2013.01); *G06F 2212/1032* (2013.01)

(58) Field of Classification Search
CPC ... G06F 12/0802; G06F 3/0619; G06F 3/065; G06F 3/0685; G06F 11/1451
See application file for complete search history.

(56) References Cited

U.S. PATENT DOCUMENTS 5,724,501 A * 3/1998 Dewey ................ G06F 12/0866
711/E12.019
2008/0276040 A1   11/2008   Moritoki
2010/0325522 A1   12/2010   Tsukamoto et al.
2011/0010582 A1    1/2011   Tsukamoto et al.

FOREIGN PATENT DOCUMENTS

| JP | 04358243 A | 12/1992 |
| JP | 2549197 B2 | 8/1996 |
| JP | 2008-276646 A | 11/2008 |
| JP | 2011-18241 A | 1/2011 |
| WO | 2009/107213 A1 | 9/2009 |

* cited by examiner

Primary Examiner — Larry Mackall
(74) Attorney, Agent, or Firm — Volpe and Koenig, P.C.

(57) ABSTRACT

A storage system 100 includes a storage apparatus 125 and a storage controller 115 configured to control the storage apparatus. The storage controller adds a predetermined flag 425 to every predetermined size of data requested by a host computer to be written to the storage system, and stores the resultant data in a cache memory 278C. Upon detecting a predetermined trigger for saving, the storage controller stores, in a nonvolatile memory 284, data with the flag added thereto out of the data stored in the cache memory. The storage controller detects, as unsaved data information 620, a data size and a storage location for data with no flag added thereto out of the data on the cache memory, and stores the detected unsaved data information in the nonvolatile memory in association with the data with the flag added thereto.

14 Claims, 23 Drawing Sheets

ELECTRONIC STORAGE SYSTEM UTILIZING A PREDETERMINED FLAG FOR SUBSEQUENT PROCESSING OF EACH PREDETERMINED PORTION OF DATA REQUESTED TO BE STORED IN THE STORAGE SYSTEM

TECHNICAL FIELD

The present invention relates to a storage system.

BACKGROUND ART

DRAM (Dynamic Random Access Memory) widely used in a storage apparatus as a cache memory is volatile and may be subjected to a data loss as a result of possible power outage or the like.

Thus, to prevent a possible data loss, many storage apparatuses back up data by transferring data stored in the cache memory to a nonvolatile memory medium when the power goes down. To ensure that the data stored in the cache memory is reliably backed up, battery capacity needs to be increased to allow a backup process to be normally carried out until the process is completed.

However, the increased battery capacity increases the costs of the storage apparatus. Thus, as a technique for supporting the backup process with a small battery capacity, a technique is used which involves saving of unwritten data on the cache memory (PTL 1). According to this conventional technique, the data in the cache memory is temporarily saved to a save area in a particular disk apparatus at the time or power outage or the like. Thus, large-capacity data is saved to the disk apparatus in a short time.

CITATION LIST

Patent Literature

[PTL 1]
Japanese Patent No. 2549197

SUMMARY OF INVENTION

Technical Problem

According to the conventional technique, at the time point of saving to the save area in the disk apparatus, all data other than the unwritten data stored in the cache memory is saved to the save area. Thus, a reduction in the volume of data saved is prevented. This in turn precludes a reduction in time needed for data saving and thus prevents suppression of the battery capacity.

With the forgoing in view, it is an object of the present invention to provide a storage system that allows a reduction in the volume of data saved.

Solution to Problem

A storage system according to an aspect of the present invention is a storage system coupled to a host computer, the storage system including a storage apparatus configured to store data written by a host computer, and a storage controller configured to control the storage apparatus, the storage controller including a microprocessor, a cache memory used by the microprocessor, and a nonvolatile memory coupled to the cache memory, wherein the storage controller is configured to add a predetermined flag to every predetermined size of data requested by the host computer to be written to the storage system, and store the resultant data in the cache memory, to transfer data with the predetermined flag added thereto out of the data stored in the cache memory to the nonvolatile memory for storage when the storage controller detects a preset predetermined trigger for saving, and to detect, as unsaved data information, a data size and a storage location for data with no predetermined flag added thereto out of the data stored in the cache memory, and transfer the detected unsaved data information to the nonvolatile memory so that the unsaved data information is stored in the nonvolatile memory in association with the data with the predetermined flag added thereto.

Advantageous Effects of Invention

The present invention enables a reduction in the volume of data saved and in costs needed for backup.

DESCRIPTION OF EMBODIMENTS

Figure 1:
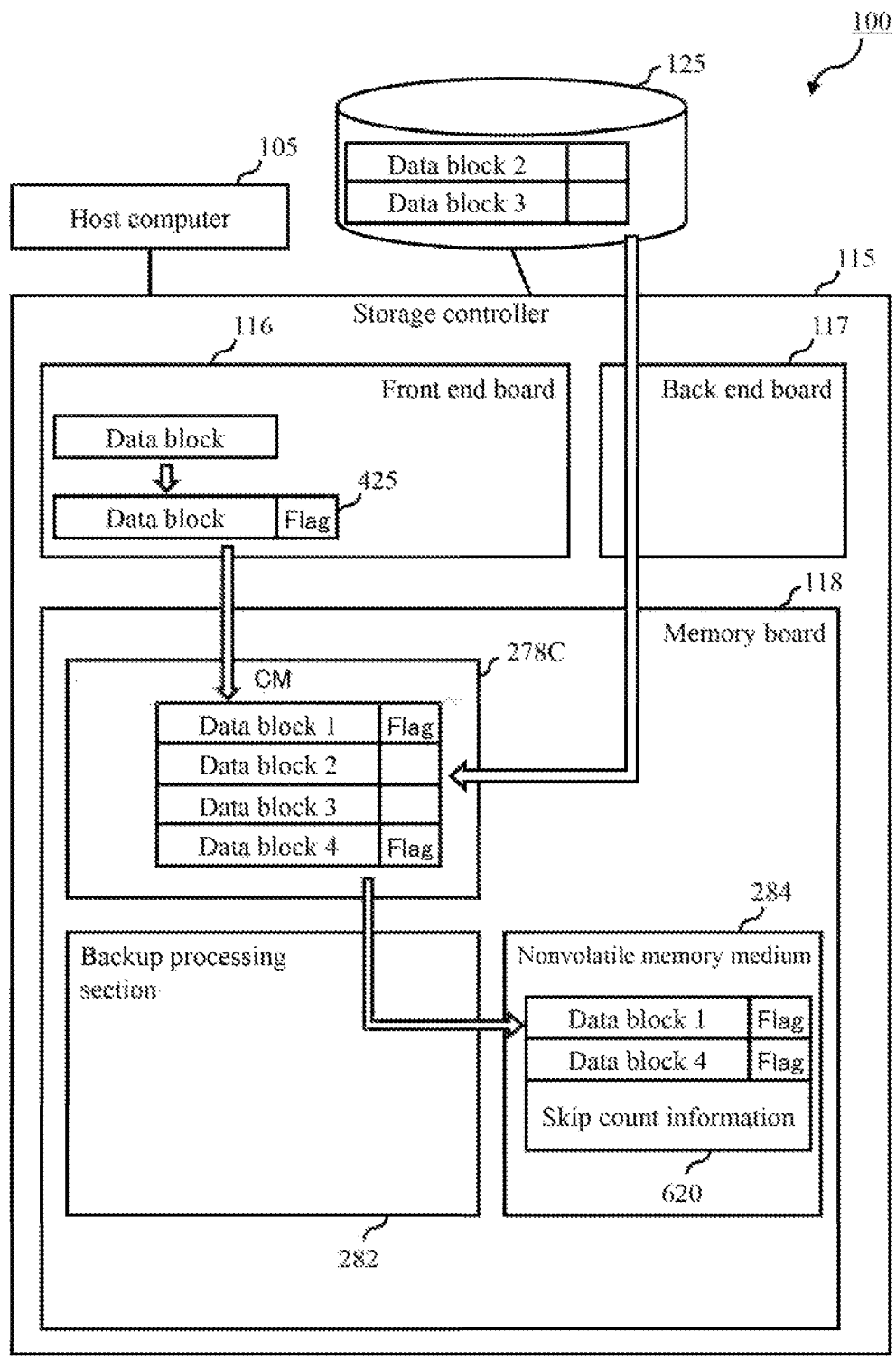
FIG. 1 is diagram schematically illustrating an embodiment.

Embodiments of the present invention will be described below with reference to the drawings. In the description below, various types of information are sometimes expressed as "management tables" or the like. However, the various types of information may be expressed using a data structure other than tables. Furthermore, to indicate independence from the data structure, the "management table" may be referred to as "management information".

Additionally, processes may be described using a "program" as a subject. The program is executed by, for example, a CPU (Central Processing Unit) to carry out a specified process. The process is carried out by appropriately using a storage resource (for example, a memory) and a communication interface apparatus (for example, a communication port), and thus, the subject for the process may be a processor. The processor may have dedicated hardware in addition to the CPU. A computer program may be installed into each computer from a program source. The program source may be provided via a program distribution host computer or a storage medium.

Furthermore, elements may be identified by numbers or the like. However, another type of identification information such as names may be used provided that the information can be identified. In the figures and description of the present invention, the same components are denoted by the same reference numerals. However, the present invention is not limited to the embodiments. Any applications conforming with the concepts of the present invention are included in the technical scope of the present invention. Additionally, for each component, a single component or a plurality of components may be provided, unless otherwise specified.

FIG. 1 schematically shows the present embodiment. A storage system 100 is coupled to a host computer 105. The storage system 100 includes a storage controller 115 and a disk 125. Write data from the host computer 105 is received by a front end board 116 that serves to communicate with the host computer 105.

The front end board 116, which is an example of a "host side communication interface section", divides the write data received from the host computer 105, into data processing units in the storage controller 115. The front end board 116 adds a predetermined flag to each of the data processing units.

The data processing unit corresponds to a "predetermined data size" and may be, for example, a data block unit, a segment unit including a plurality of data blocks, or a slot unit including a plurality of segments. The present embodiment will be described taking the addition of the predetermined flag to each data block as an example. Furthermore, in the description below, the predetermined flag is sometimes simply referred to as a flag. The predetermined flag is referred to as a dirty block flag in the embodiments described below.

A predetermined flag 425 added to a data block indicates that the data block has dirty data. The dirty data is stored only in a cache memory 278C and is not stored in a disk 125. In an example described below, the flag is referred to as a dirty block flag.

The front end board 116 transfers a data block with the flag added thereto to a memory board 118 and the data block is stored in the cache memory 278C in the memory board 118. Then, a destage process is carried out at an appropriate timing. The destage process is a process of storing data on the cache memory 278C in the disk 125. When the data on the cache memory 278C is written to the disk 125, the status of the data changes from dirty to clean. In the destage process, when a data block on the cache memory 278C is stored in the disk 125, the flag added to the data block is removed. This is because, when the data block is written to the disk 125, the status of the data block changes from dirty to clean.

When power outage or the like occurs, the data blocks stored on the cache memory 278C are saved to a nonvolatile memory medium 284. A backup processing section 282 controls the process of saving data from the cache memory 278C to the nonvolatile memory medium 284. The backup processing section 282 checks whether or not the flag is added to each data block. The backup processing section 282 then transfers only data blocks with the flag added thereto to the nonvolatile memory medium 284. Upon detecting a data block with no flag added thereto, the backup processing section 282 counts the number of data blocks until the next data block with the flag added thereto. This count information is the number which skipped the data blocks without the flag, it is called skip count information 620.

The skip count information is information indicating how many data blocks with no flag are present between data blocks with the flag and where the data blocks with no flag are located. The skip count information is an example of "non-saved data information" indicative of the total data size and storage location of data blocks with no flag. The storage location means information indicative of the positional relationship with the data blocks with the flag. In transferring data blocks with the flag added thereto to the nonvolatile memory medium 284, the backup processing section 282 also transfers the skip count information.

Upon recovering from the power outage, the storage controller 115 transfers the data blocks from the nonvolatile memory medium 284 to the cache memory 278C based on the skip count information to restore the data present before the occurrence of the power outage.

In the present embodiment configured as described above, the write data received from the host computer 105 is divided into data blocks, and the predetermined flag for controlling data saving is configured for each data block. Thus, the present embodiment enables determination of whether or not saving and recovery are possible for each data block. As a result, the present embodiment allows each data block to be saved to the nonvolatile memory medium and allows data to be restored in the cache memory 278C.

The present embodiment allows only the needed data to be saved and enables a reduction in backup time. The present embodiment eliminates the need for a large-capacity battery as a result of the reduced backup time. The present embodiment enables a reduction in costs needed for data management as a result of a decrease in backup time and thus in management time and prevention of an increase in battery costs. In particular, in such a case where a large volume of data is read and analyzed as is the case with Big Data analysis, the present embodiment effectively allows a reduction in dirty data on the cache memory. The present embodiment will be described below in detail.

First Embodiment

In the present embodiment, an example of a method of reducing the volume of data saved from the cache memory 278C in the storage apparatus will be described.

Figure 2:
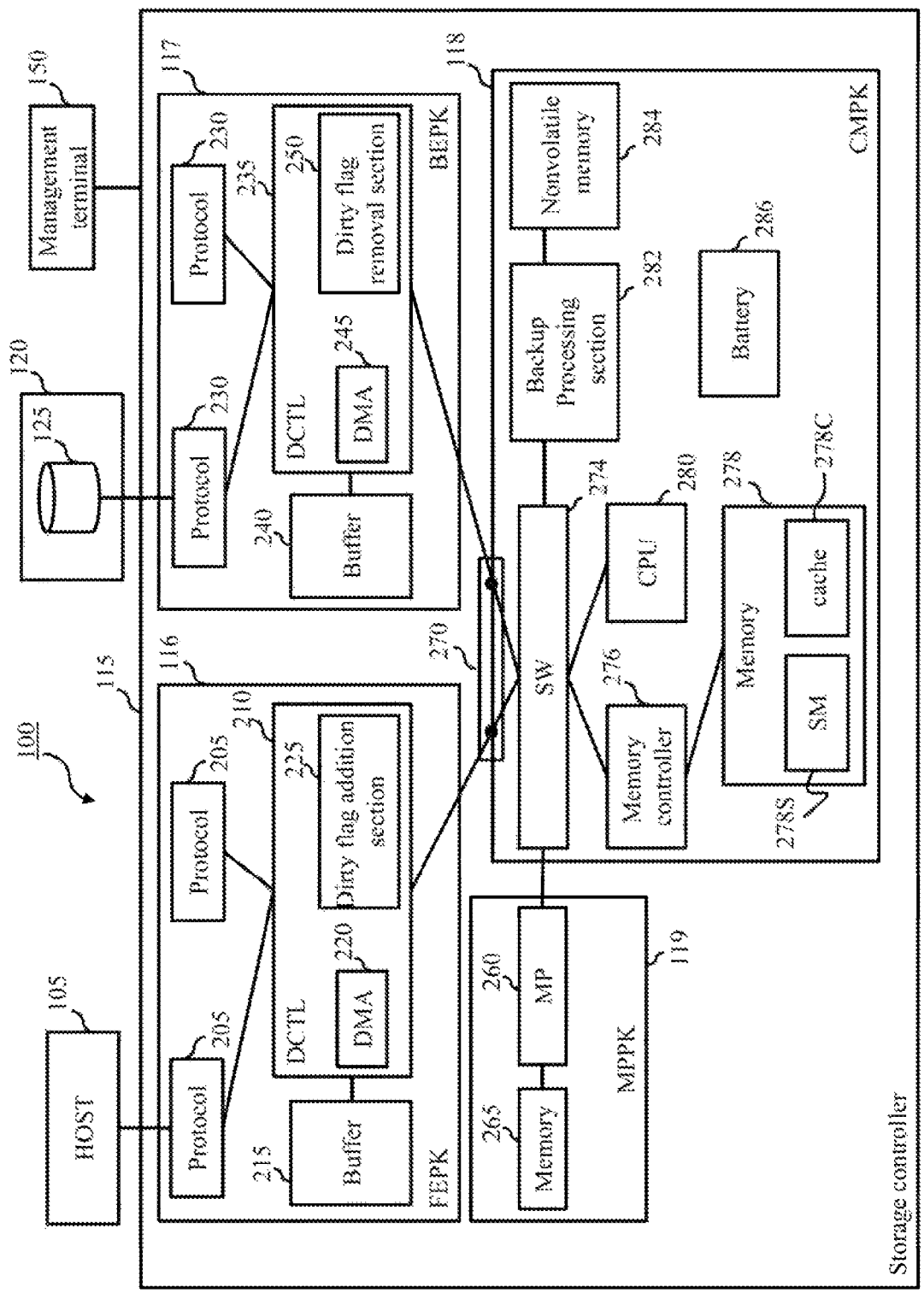
FIG. 2 is a block diagram of a storage system.

FIG. 2 shows an example of the storage system 100. The storage system 100 is coupled to the host computer 105, which carries out data processing and calculations. The storage system 100 includes, for example, the storage controller 115 and a disk enclosure 120 in which the disk 125, serving as a "storage apparatus", is stored. The storage system 100 is also coupled to a management terminal 150 for managing the storage system.

A plurality of storage controllers 115 and a plurality of disk enclosures 120 may be provided. Furthermore, the storage system 100 may simultaneously process requests from a plurality of the host computers 105.

The storage controller 115 and the disk enclosure 120 are collectively referred to as a storage system. A system including the storage system and both the host computer 105 and the management terminal 150 may also be referred to as a computer system.

In general, in an SAN (Storage Area Network), the host computer 105 and the storage controller 115 are coupled together by Fibre Channel, Ethernet (registered trade mark), or the like via a network including switches (not shown in the drawings).

The host computer 105 transmits a data write request or a data read request to the storage controller 115. The host computer 105 may be what is called an open protocol server or a main frame computer.

Upon receiving a read request (read command) from the host computer 105, the storage controller 115 reads data requested to be read, from the disk enclosure 120, and transmits the read data to the host computer 105. Upon receiving a write request (write command) from the host computer 105, the storage controller 115 writes data requested to be written, to the disk enclosure 120.

The disk enclosure 120 includes a plurality of the disks 125 as storage media. The disk 125 may be a HDD (Hard Disk Drive) or an SSD (Solid State Drive) in which a nonvolatile memory such as a flash memory is mounted. In addition, any of various media may be used such as MRAM (Magnetoresistive Random Access Memory), phase-change memory, ReRAM (Resistive random-Access Memory), and FeRAM (Ferroelectric Random Access Memory).

Data from the host computer 105 is stored in the disk 125. A plurality of the disks 125 may provide a RAID (Redundant Arrays of Inexpensive Disks) group for redundant management of data. Then, even if a failure occurs in a certain disk 125 providing the RAID group, data stored in the disk 125 may be restored based on data or parity in other one or more disks 125 belonging to the same RAID group.

The storage controller 115 is an apparatus that controls the storage system 100 and includes, for example, a front end board 116 serving as a "host side communication interface section", a back end board 117 serving as an "apparatus side communication interface section", a memory board 118, and a processor board 119. FIG. 2 shows that a single board is provided for each of the boards 116 to 119. However, for each of at least some or all of the boards 116 to 119, two or more boards may be provided.

The front end board 116 serves to communicate with the host computer 105. The front end board (denoted by FEPK in FIG. 2) 116 includes, for example, at least one protocol processing section 205, at least one data transfer control section (denoted by DCTL in FIG. 2) 210 and at least one buffer memory 215.

The protocol processing section 205 of the front end board 116 carries out a protocol process on a packet received from the host computer 105. Specifically, by carrying out the protocol process, the front end board 116 determines a location in the disk enclosure 120 where the received packet is stored, the capacity of the received packet, and a command contained in the received packet. Furthermore, by carrying out the protocol process, the front end board 116 converts the received packet into a form that can be stored in the disk enclosure 120.

Moreover, the front end board 116 carries out another protocol process on a packet transmitted to the host computer 105. Specifically, the front end board 116 adds, for example, identification data on the host computer 105, which is a destination, and control data on a command for the host computer 105, which is a source, to the read data based on a communication protocol between the storage controller 115 and the host computer 105, to generate a packet that can be transmitted to the host computer 105. Thus, the front end board 116 carries out processes such as a conversion between a logical address and a physical address, configuration of a guarantee code, and addition of a dirty block flag. In the figures, the dirty block flag may be represented as a dirty flag.

The back end board 117 serves to communicate with the disk enclosure 120. The back end board (denoted by BEPK in the figures) 117 may have the same functions as the functions of the front end board 116. For example, the back end board 117 carries out a protocol process on a packet received from the disk enclosure 120. The back end board 117 also converts the packet into a form that can be stored in the disk enclosure 120. Thus, the back end board 117 carries out processes such as a conversion between a logical address and a physical address and deletion of the dirty block flag.

The memory board 118 supplies memory resources. The memory board (denoted by CMPK in the figures) 118 includes, for example, a transmission and reception port 270, an internal switch 274, a memory controller 276, a memory 278, a microcomputer (denoted by CPU in the figures) 280, the backup processing section 282, the nonvolatile memory medium 284, and a battery 286. In the figures, the nonvolatile memory medium may be represented as nonvolatile memory.

The memory 278 includes the cache memory 278C, in which data communicated to and from the host computer 105 is temporarily stored and a control memory 278S in which control data, configuration data, directory data, and the like in the storage system 100 are stored. In the figures, the control memory is denoted by "SM".

The processor board 119 controls components in the storage controller 115 such as the front end board 116 and the back end board 117. The processor board (denoted by MPPK in the figures) 119 configures data transfer parameters for the front end board 116 and the back end board 117. The processor board 119 also monitors a possible failure in the storage system 100, and upon detecting a failure, carries out a process corresponding to the failure.

The front end board 116 will be described in detail. The protocol processing section 205 converts a protocol used for communication between the host computer 105 and the storage controller 115 into a protocol used inside the storage controller 115.

The protocol used for communication between the host computer 105 and the storage controller 115 may be, for example, FC (Fibre Channel) or FCoE (Fibre Channel over Ethernet) (registered trade mark) in which FC is transmitted on Ethernet (registered trade mark). Furthermore, when the host computer 105 is a main frame, a communication protocol used may be, for example, FICON (Fibre Connection: registered trade mark), ESCOM (Enterprise System Connection: registered trade mark), ACONARC (Advanced Connection Architecture: registered trade mark), or FIBARC (Fibre Connection Architecture: registered trade mark).

The storage controller 115 includes, for example, a plurality of boards 116 to 119 as shown in FIG. 2. Moreover, each of the boards often includes a plurality of components. Thus, the protocol used inside the storage controller 115 may be suitable for communication between a plurality of boards or communication between a plurality of components on a single board. A protocol suitable for such communication may be, for example, PCI-Express (registered trade mark) or Rapid-IO (registered trade mark), which is a computer bus standard.

The protocol processing section 205 further transfers data requested by the host computer 105 to be written, to the buffer memory 215 or reads data requested by the host computer 105 to be read, from the buffer memory 215.

The data transfer control section 210 transfers data requested by the host computer 105 to be written (write data), to the memory board 118. The data transfer control section 210 reads data requested by the host computer 105 to be read (read data), from the memory board 118 and transfers the data to the buffer memory 215.

The data transfer control, section 210 further has a DMA (Direct Memory Access) 220 and a dirty block flag addition section 225.

The DMA 220 transfers data between the buffer memory 215 and the memory board 118. Based on the data transfer parameters transferred by a processor 260 on the processor board 119, the DMA 220 stores data stored in the buffer memory 215, in a predetermined area in the memory board 118.

Furthermore, based on the data transfer parameters, the DMA 220 further reads data stored in the cache memory 278C in the memory board 118 and stores the data in a predetermined area in the buffer memory 215.

The dirty block flag addition section 225 adds the dirty block flag to data read from the buffer memory 215 by the DMA 220, the dirty block flag indicating that the data has not been stored in the disk 125 yet, that is, the data is unwritten data. The dirty block flag corresponds to a "predetermined flag".

The back end board 117 will be described. The back end board 117 has, for example, at least one protocol processing section 230, at least one data transfer control section 235, and at least one buffer memory 240.

The protocol processing section 230 converts a protocol used between the disk enclosure 120 and the storage controller 115 into a protocol used inside the storage controller 115.

The protocol used between the disk enclosure 120 and the storage controller 115 may be, for example, SAS (Serial Attached SCSI) or FC (Fibre Channel).

The storage controller 115 often includes the plurality of boards 116 to 119, and each of the boards includes a plurality of components. Thus, the protocol used inside the storage controller 115 is, for example, PCI-Express (registered trade mark) or Rapid-IO (registered trade mark), as described for the front end board 116.

The protocol processing section 230 reads data to be written to the disk enclosure 120, from the buffer memory 240. The protocol processing section 230 writes data read from the disk enclosure 120, to the buffer memory 240.

The data transfer control section 235 reads data requested by the processor 260 of the processor board 119 to be written to the memory board 118, from the buffer memory 240, and transfers the data to the memory board 118. The data transfer control section 235 reads data on the cache memory 278C requested by the processor 260 of the processor board 119 to be read, from the cache memory 278C, and transfers the data to the buffer memory 240.

Moreover, the data transfer control section 235 further has a DMA 245 and a dirty block flag removal section 250.

The DMA 245 transfers data between the buffer memory 240 and the memory board 118. Based on the data transfer parameters transferred by the processor 260 on the processor board 119, the DMA 245 stores data stored in the buffer memory 240, in a predetermined area in the cache memory 278C in the memory board 118. Furthermore, based on the data transfer parameters, the DMA 245 further reads data stored in the cache memory 278C in the memory board 118 and stores the data in a predetermined area in the buffer memory 240.

The dirty block flag removal section 250 removes the dirty block flag, which is indicative of unwritten data, from data blocks read from the cache memory 278C by the DMA 245.

The back end board 117 removes the dirty block flag for the following reason. The disk 125 is a nonvolatile memory medium. Thus, even if a contingency such as power outage occurs at a time point when data stored in the cache memory 278C is stored in the disk 125, the data stored in the disk 125 is held. That is, at a time point when write data received from the host computer 105 is stored both in the cache memory 278C and in the disk 125, the write data has its status changed from dirty to clean and is no longer dirty data. Therefore, when the data (data blocks) stored in the cache memory 278C is stored in the disk 125, the back end board 117 removes the dirty block flags from the data blocks.

The processor board 119 will be described. The processor board 1119 has the processor 260 and a local memory 265 as described above. Although not shown in FIG. 2, the processor board 119 also includes an I/O coupling mechanism for coupling the processor 260 to other peripheral devices.

The processor 260 controls the storage controller 115. For example, to reference or update control data, configuration data, directory data, and the like in the storage system 100, the processor 260 accesses the control memory 278S.

The processor 260 allows data received from the host computer 105 to be transferred to the memory board 118 by transmitting the data transfer parameters to the DMA 220 in the data transfer control section 210 of the front end board 116 or to the DMA 245 in the data transfer control section 235 of the back end board 117. The processor 260 monitors a possible failure in the storage controller 115 or in the disk enclosure 120, and upon detecting a failure, carries out a process corresponding to the failure.

The local memory 265 stores data handled by the processor 260, a predetermined computer program executed by the processor 260, and the like. The processor 260 executes the predetermined computer program to allow the storage controller 115 to process a write command, a read command, and the like.

The memory board 118 will be described. The transmission and reception port 270 of the memory board 118 has a signal processing function corresponding to a physical layer and a data link layer in an OSI (Open Systems Interconnection) reference model.

The internal switch 274 serves to allow the memory board 118 to communicate with each of the other boards 116, 117, and 119. The internal switch 274 couples the other boards 116, 117, and 119 to the memory controller 276 and the microcomputer 280 to relay communications among the boards.

The memory controller 276 controls data inputs to and data outputs from the memory 278. The memory controller 276 interprets a packet received from the front end board 116 or the like to control reading from and writing to the memory 278.

The memory 278 includes the cache memory 278C and the control, memory 278S as described above. The memory 278 temporarily stores data communicated to and from the host computer 105 or the disk enclosure 120 and stores control information needed to control the interior of the storage controller 115.

The microcomputer 280 controls saving of data stored in the memory 278 to the nonvolatile memory medium. Furthermore, the microcomputer 280 controls power supply from the battery 286, monitors the battery 286 for a charge status, and reports the status of the battery 286 to the management terminal 150.

The backup processing section 282 writes data stored in the cache memory 278C, to the nonvolatile memory medium 284, or reads data stored in the nonvolatile memory 284. The backup processing section 282 will be described in detail with reference to FIG. 3.

The nonvolatile memory medium 284 provides an area to which data stored in the cache memory 278C is stored. Any type of nonvolatile memory medium may be used provided that the nonvolatile memory medium 284 can hold data in a nonvolatile manner.

Figure 3:
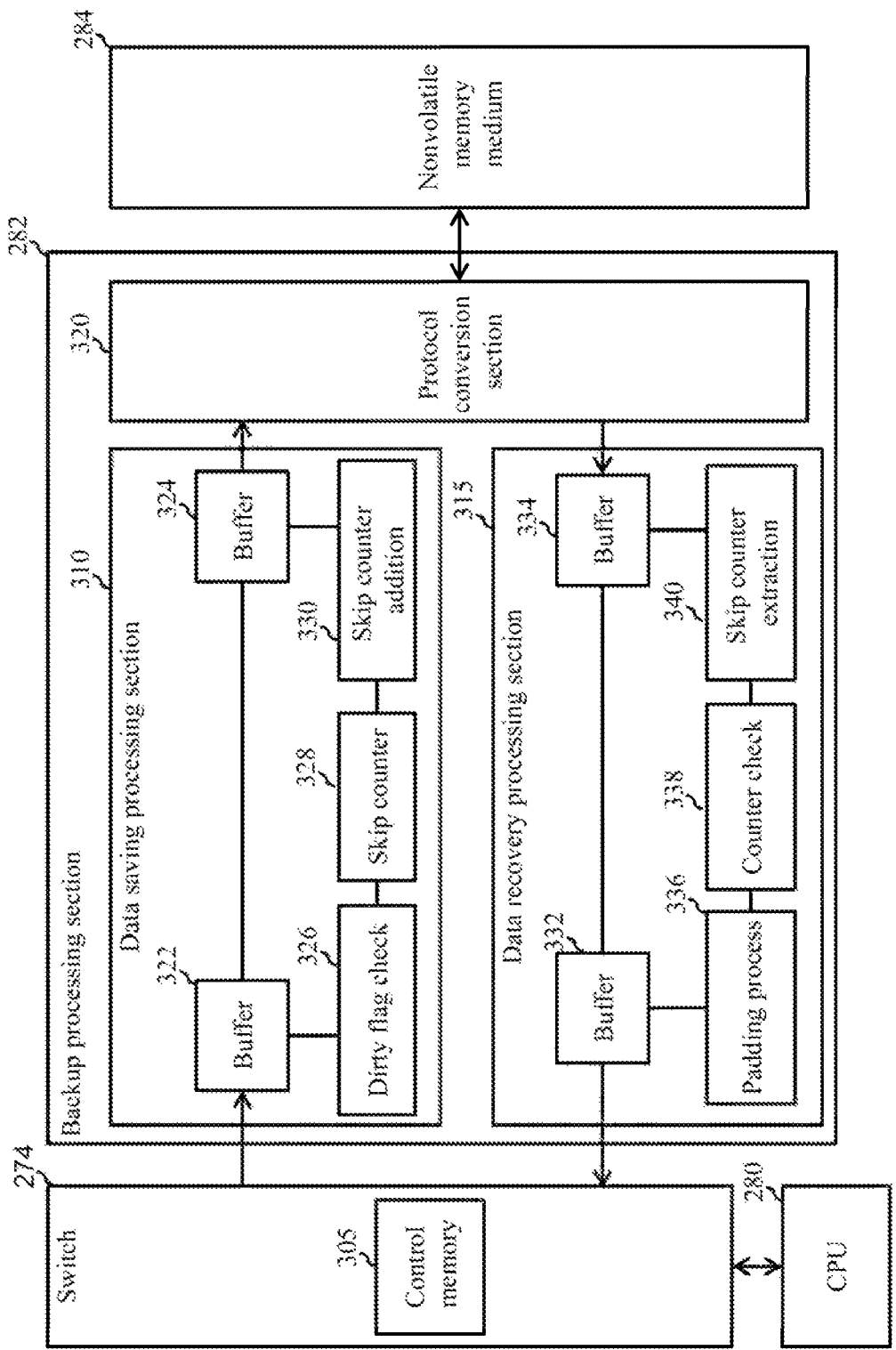
FIG. 3 is a block diagram of a backup processing section.

FIG. 3 is a block diagram showing a configuration of the backup processing section 282. The backup processing section 282 has, for example, a data saving processing section 310, a data recovery processing section 315, and a protocol conversion section 320. The backup processing section 282 is provided between the internal switch 274 and the nonvolatile memory medium 284.

The data saving processing section 310 is a circuit that transfers data from the cache memory 278C to the nonvolatile memory medium 284. When saving data stored in the cache memory 278C, to the nonvolatile memory medium 284, the data saving processing section 310 checks whether the dirty block flag is added to the data and counts the number of data blocks with no dirty block flag added thereto (this counting is hereinafter referred to as skip count). The data saving processing section 310 further outputs data blocks to be stored in the nonvolatile memory medium 284 and skip count information to the protocol conversion section. The above-described process will be described with reference to FIG. 6.

The data saving processing section 310 has, for example, a plurality of buffers 322 and 324, a dirty block flag check section 326, a skip counter 328, and a skip counter information addition section 330. In the figures, the skip counter information addition section 330 is represented as skip counter addition section 330.

The input buffer 322 stores data received from the internal switch 274. The output buffer 324 stores data to be output to the nonvolatile memory medium 284.

The dirty block flag check section 326 checks whether the dirty block flag (flag) is added to data blocks stored in the buffer 322. The dirty block flag check section 326 increments the skip counter 328 when the dirty block flag is not added to a processing target data block. The dirty block flag check section 326 clears the skip counter 328 when the dirty block flag is added to the data block.

The skip counter 328 is a counter for counting the number of data blocks with no dirty block flag added thereto. The skip counter 328 counts up upon detecting a data block with clean data stored therein, that is, upon detecting a data block already stored in the disk 125.

The disk 125 is generally a nonvolatile memory medium, and thus, a data block to be counted up (clean data block) need not be saved to the nonvolatile memory medium 284.

However, when the number of data blocks that are not saving targets fails to be managed, data reconfiguration is difficult when the storage system 100 recovers from power outage or the like. When data saved in the nonvolatile memory medium 284 is simply transferred to the cache memory 278C, the resultant data block storage state differs from the storage state present before the saving, leading to inconsistency in the control program that controls the storage controller 115. Thus, to make the resultant data block storage state the same as the storage state present before the saving, the present embodiment uses the skip counter 328 for counting the number of unsaved data blocks to save the skip count value in association with dirty blocks (data blocks in which dirty data is stored).

The skip counter information addition section 330 adds the information (skip count value) resulting from the counting performed by the skip counter 328 to the dirty blocks with the dirty block flag added thereto.

The data recovery processing section 315 restores the data storage state of the cache memory 278C present before the saving based on the data blocks and skip count information stored in the nonvolatile memory medium 284. The data recovery processing section 315 then outputs the data storage state to the switch 274.

Specifically, the data blocks and skip count information read from the nonvolatile memory medium 284 are temporarily stored in an input buffer 334. Then, a skip counter extraction section 340 extracts the skip count information from the input buffer 334. When the skip count information associated with a processing target data block is 0, a counter check section 338 transfers the processing target data block from the input buffer 334 to an output buffer 332 because the processing target data block is a dirty block with the dirty block flag added thereto.

In contrast, when the skip count information is other than 0 (for example, 2), the processing target data block is a data block with no dirty block flag added thereto, that is, a data block of clean data (clean block). The data block of clean data is also stored in the disk 125 and thus need not be restored in the cache memory 278C. Thus, for the data blocks with no dirty block flag, a padding processing section 336 stores data blocks with all data configured to 0 in the output buffer 332. Then, only data blocks that need to be continuously managed (data blocks with the dirty block flag) are restored on the cache memory 278C.

The protocol conversion section 320 converts a data transfer protocol used between the internal switch 274 and the nonvolatile memory medium 284. The protocol conversion section 320 also has a function to save data blocks stored in the cache memory 278C to the nonvolatile memory medium 284 and to transfer data blocks stored in the nonvolatile memory medium 284 to the cache memory 278C.

Control information used in the protocol conversion section 320 is stored in a control memory 305 provided in the internal switch 274. The protocol conversion section 320 references the control memory 305 as necessary to carry out data transfer and the like. The control information stored in the control memory 305 includes a target data range for data transfer between the cache memory 278C and the nonvolatile memory medium 284.

Figure 4:
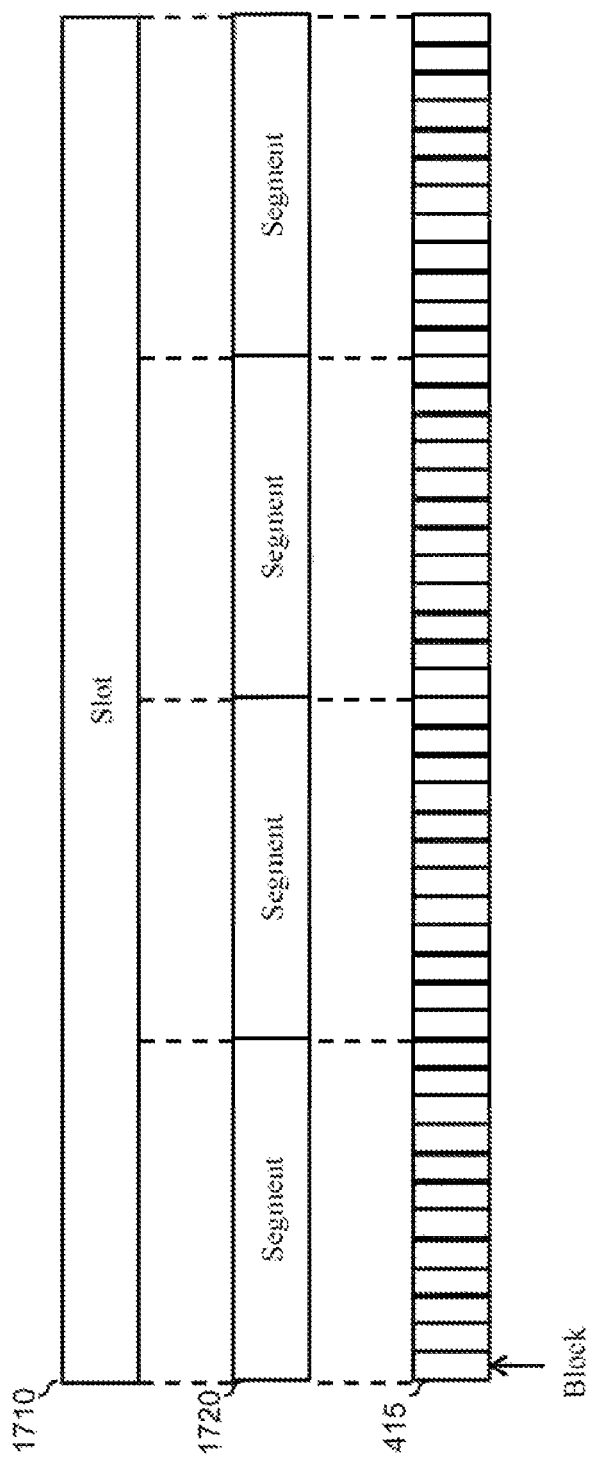
FIG. 4 is a diagram illustrating a data structure in a cache memory.

For example, the data structure of the cache memory 278C will be described using FIG. 4 and FIG. 5. FIG. 4 is a diagram illustrating relations between a slot and segments and blocks. One slot 1710 includes a plurality of segments 1720. Each of the segments 1720 includes a plurality of blocks 415.

Figure 5:
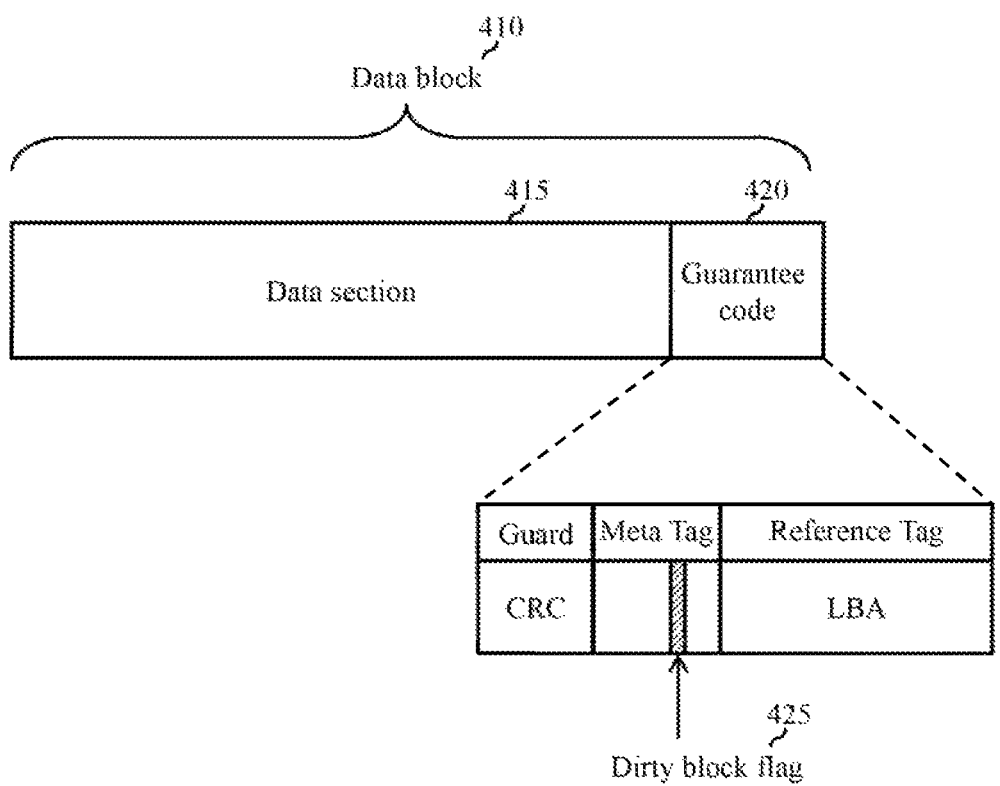
FIG. 5 is a diagram showing a format of a data block.

FIG. 5 is a diagram illustrating, for example, the relation between a data block 410 and the dirty block flag 425. The data block 410 is a basic unit for data processed by the storage controller 115. In many cases, the storage system 100, constructed using an SAN, transmits and receives data in units of blocks.

The data block 410 has a data section 415 and a guarantee code 420. The data section 415 is data itself transmitted and received between the host computer 105 and the storage controller 115.

The guarantee code 420 is redundant data added to the data section 415 in order to improve the reliability of the data in the data section 415. The guarantee code 420 is used to detect and correct garbled data and the like. The guarantee code 420 may be, for example, parity, CRC (Cyclic Redundancy Code), or T10DIF (Data Integrity Field) defined by the standards organization T10.

The dirty block flag 425 is configured in a partial area (for example, a meta tag area) of the guarantee code 420. The dirty block flag 425 is a flag indicating that the data block is a dirty block, that is, the data block has not been stored in the disk 125 yet. The logical address of the data block is stored in the other area of the guarantee code 420.

An example of the size of the data block 410 will be described. For example, the data section 415 may be 512 bytes in size. The guarantee code 420 may be 8 bytes in size. The data block 410 may be 520 bytes in size. The dirty block flag may have 1 bit. The normal block 415 shown in FIG. 4 is 512 bytes in size. Thus, the data block 410 shown in FIG. 5 is larger in size than the normal data block 415 (represented as data section in the figures) by an amount equivalent to the guarantee code 420. The data block 410 may be referred to as an expanded block.

Figure 6:
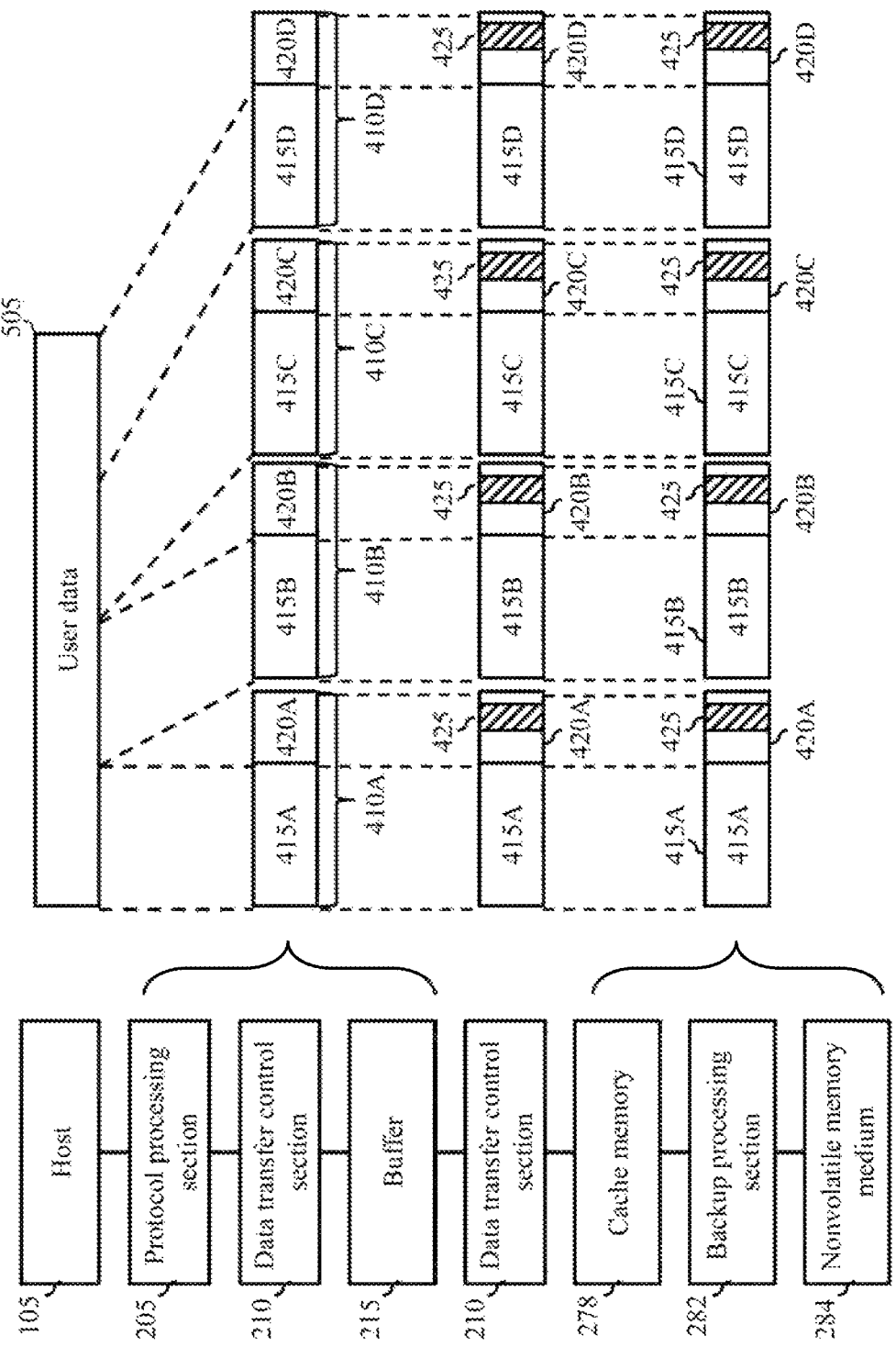
FIG. 6 is a diagram illustrating a state from configuration of a dirty block flag for write data until storage of the write data in a nonvolatile memory medium.

FIG. 6 shows transition of a block data format observed from reception of write data issued by the host computer 105 until storage of the data in the nonvolatile memory medium 284.

Write data (user data) 505 transmitted to the storage controller 115 by the host computer 105 reaches the protocol processing section 205 of the front end board 116 via the SAN. The user data 505 is transmitted in units of frames that are transmission and reception units for Fibre Channel, which is a typical transfer protocol for the SAN. The frame unit is generally 2 KB.

The protocol processing section 205 stores the user data 505 received from the host computer 105 in the buffer 215 via the data transfer control section 210. The received data 505 is processed in units of blocks in the storage controller 115. Thus, the front end board 116 divides the received data 505 into pieces equivalent to block units, and adds the guarantee code 420 to each of the blocks.

Thus, in FIG. 6, a data section 415A and a guarantee code 420A provide a data block 410A. Similarly, a data section 415B and a guarantee code 4208 provide a data block 420B, a data section 415C and a guarantee code 420C provide a data block 410C, and a data section 415D and a guarantee code 4200 provide a data block 4100.

The data transfer control section 210 transfers the data block 410 stored in the buffer 215 to the cache memory 278C. The data transfer control section 210 adds the dirty block flag 425 to a predetermined in the guarantee code 420, and transfers the data block to the cache memory 278C. Subsequently, the data block has a similar format while migrating from the cache memory 273C though the backup processing section 282 to the nonvolatile memory medium 284.

Figure 7:
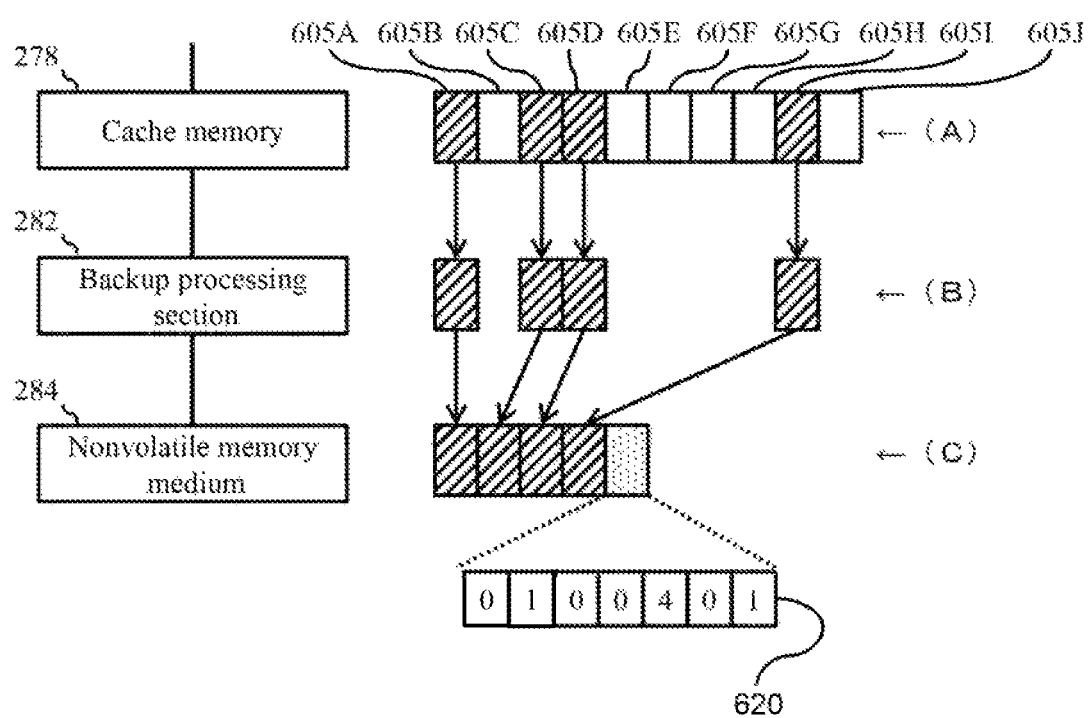
FIG. 7 is a diagram illustrating how blocks of clean data are skipped and the number of the skipped blocks is saved to the nonvolatile memory medium in association with dirty blocks.

FIG. 7 shows that data stored in the cache memory 278C is sorted depending on whether or not the dirty block flag 425 is present and that only dirty blocks with dirty data stored therein are transferred to the nonvolatile memory medium 284.

As shown in FIG. 7(A), a plurality of data blocks shown as data blocks 605A to 605J are stored in the cache memory 278C. Among the plurality of data blocks, data blocks 605A, 605C, 605D, and 605I shown with oblique lines are dirty blocks. Data blocks 605B, 605E, 605F, 605G, 605H, and 605J shown as blank rectangles are clean blocks.

The backup processing section 282 reads the data blocks 605A to 605J stored in the cache memory 278C. The backup processing section 282 determines the type of the data block depending on whether the dirty block flag 425 is added to the data block.

The dirty block flag is added to the data block 605A, and thus, the backup processing section 282 determines the data block 605A to be targets for saving to the nonvolatile memory medium 284. The backup processing section 282 determines the data block 605A to be a dirty block and thus clears (zeros) the skip counter 328.

The data block 605B, the next processing target, has no dirty block flag added thereto, and thus, the backup processing section 282 avoids determining the data block 605B to be a target for saving to the nonvolatile memory medium 284. Since the data block 605B is not a saving target, the backup processing section 282 increments the skip counter 328. In this case, the value in the skip counter 328 is 0 and thus becomes 1.

Moreover, the data block 605C, the next processing target, has the dirty block flag added thereto, and thus, the backup processing section 282 determines the data block 605C to a target for saving to the nonvolatile memory medium 284. The backup processing section 282 clears the skip counter 328.

Subsequently, the backup processing section 282 repeats the above-described procedure. As a result, four data blocks (605A, 605C, 605D, and 605I) are selected as dirty blocks to be saved as shown in FIG. 7(B). Furthermore, during the sorting of the data blocks, the count value in the skip counter 328 is stored in a predetermined register. As a result, count information (01000401) is obtained.

The first target data block 605A is dirty block, and thus, the value in the skip counter 328 is 0. The next target data block 605B is a clean block, and thus, the value in the skip counter 328 is incremented to 1. The next target data block 605C and the target data block 605D, succeeding the target data block 605C, are data blocks, and thus, the value in the skip counter 328 is 0. The subsequent four data blocks 605E to 605H are all clean blocks, and thus, the value in the skip counter 328 is incremented by one four times and becomes 4. The next target data block 605I is a dirty block, and thus, the value in the skip counter 328 is reset to 0. The last target data block 6053 is a clean block, and thus, the value in the skip counter 328 is incremented to 1. As a result of the sorting of the group of processing target data blocks 605A to 6053, the value of the skip count information 620 to be stored in the register is (01000401).

As shown in FIG. 7(C), the backup processing section 282 stores the dirty blocks (605A, 605C, 605D, and 605I) extracted as saving targets in the nonvolatile memory medium 284 in association with the skip count information 620.

When data blocks stored in the nonvolatile memory medium 284 are restored to the cache memory 278C, a flow shown in FIG. 7 is basically reversely traced. The backup processing section 282 reads the data blocks (605A, 605C, 605D, and 605I) and the skip count information 620 from the nonvolatile memory medium 284.

The backup processing section 282 references the read skip count information. In this case, the first skip count information is 0, and thus, the backup processing section 282 determines that the data block 605A, which is a target for a restoration process, is a data block with the dirty block flag added thereto, that is, a dirty block. Thus, the backup processing section 282 transfers the dirty block 605A to the cache memory 278C for storage.

The next skip count information is 1, and thus, the backup processing section 282 determines that the next target data block for a restoration process is a data block with no dirty block flag added thereto, that is, a clean block.

As shown in FIG. 7(B), the backup processing section 282 subsequently repeats the above-described procedure to read all of the dirty blocks with the dirty block flag from the nonvolatile memory medium 284. When a clean block is present between a first dirty block and a second dirty block adjacent to the first dirty block, the clean block forms a gap. The backup processing section 282, for example, places padding data including zeros in the gap before allowing the data blocks to be stored in the cache memory 278C. Thus, a state in FIG. 7(B) changes to a state in FIG. 7(A).

Figure 8:
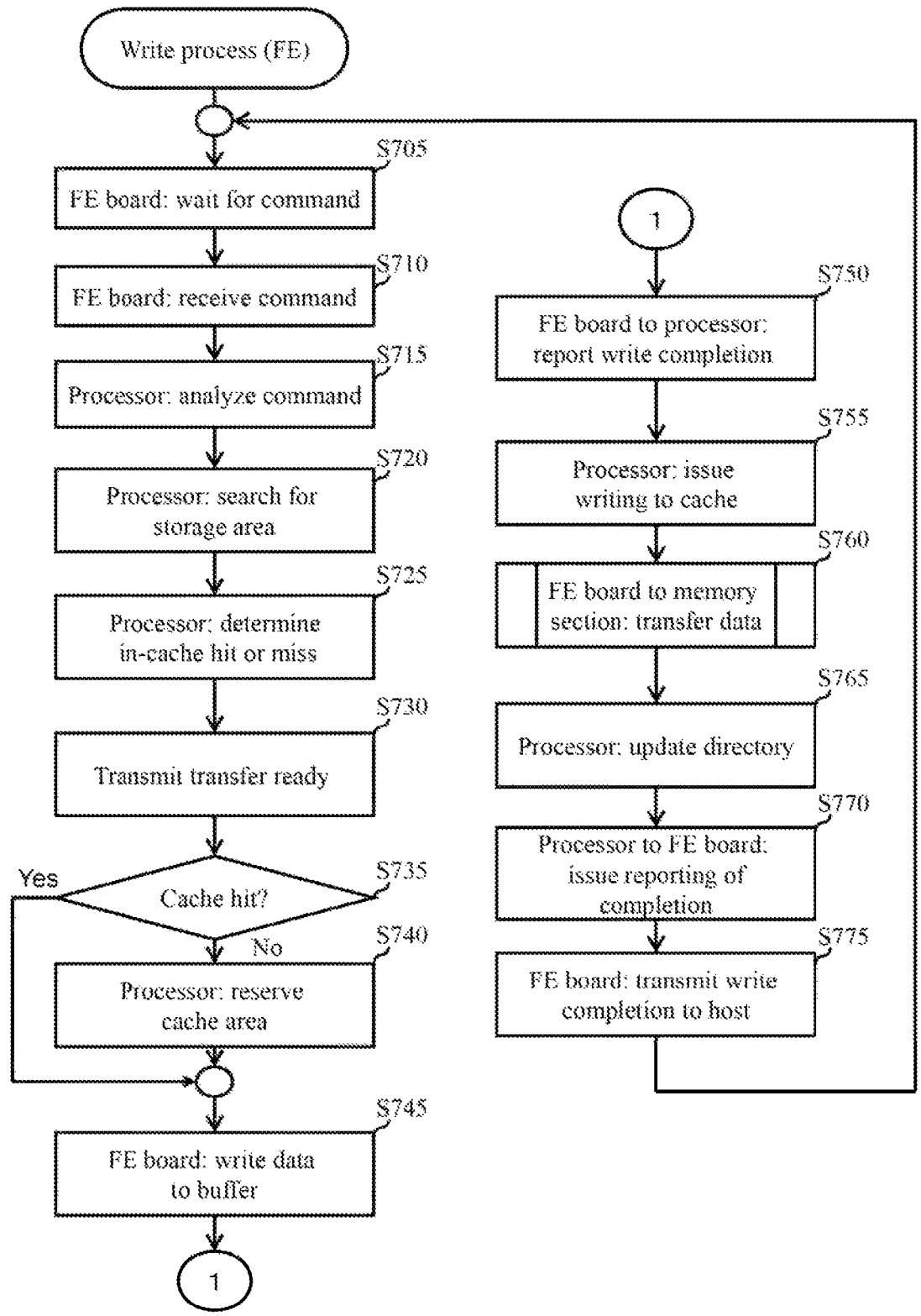
FIG. 8 is a flowchart showing a write process in a front end board.
Figure 9:
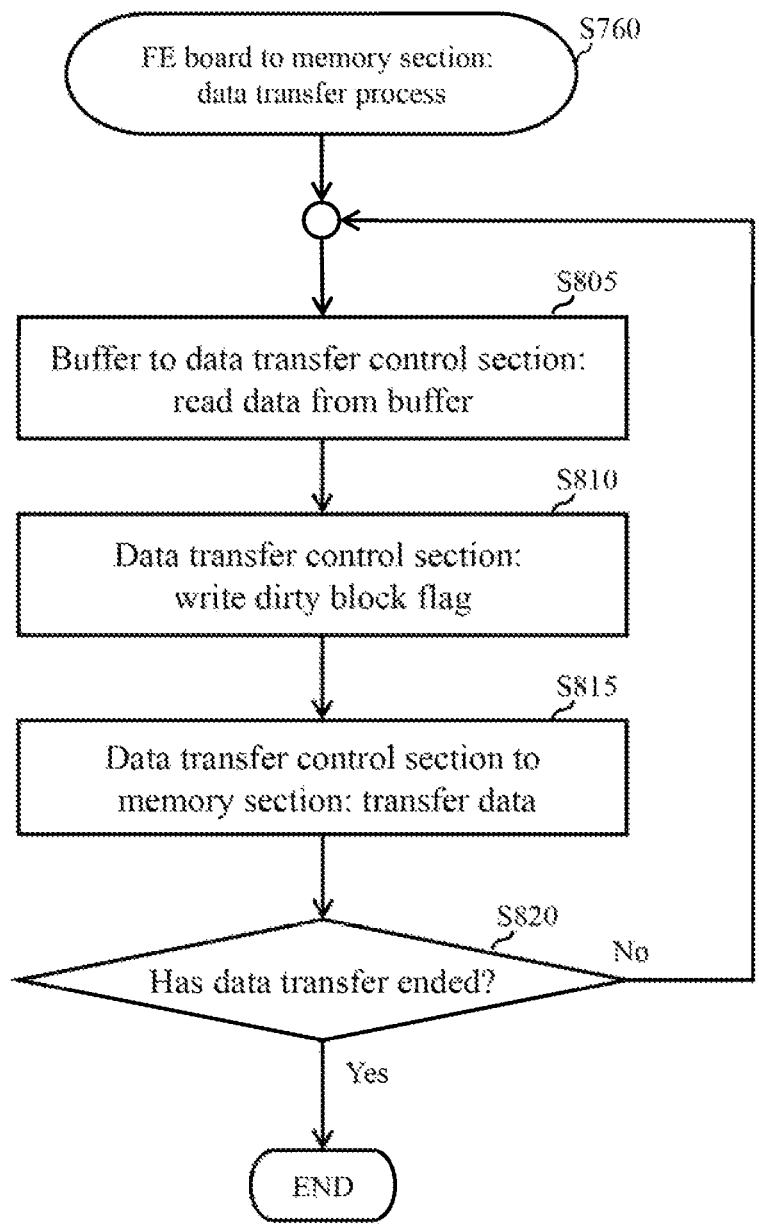
FIG. 9 is a flowchart showing a process of transferring data from the front end board to the cache memory.
Figure 10:
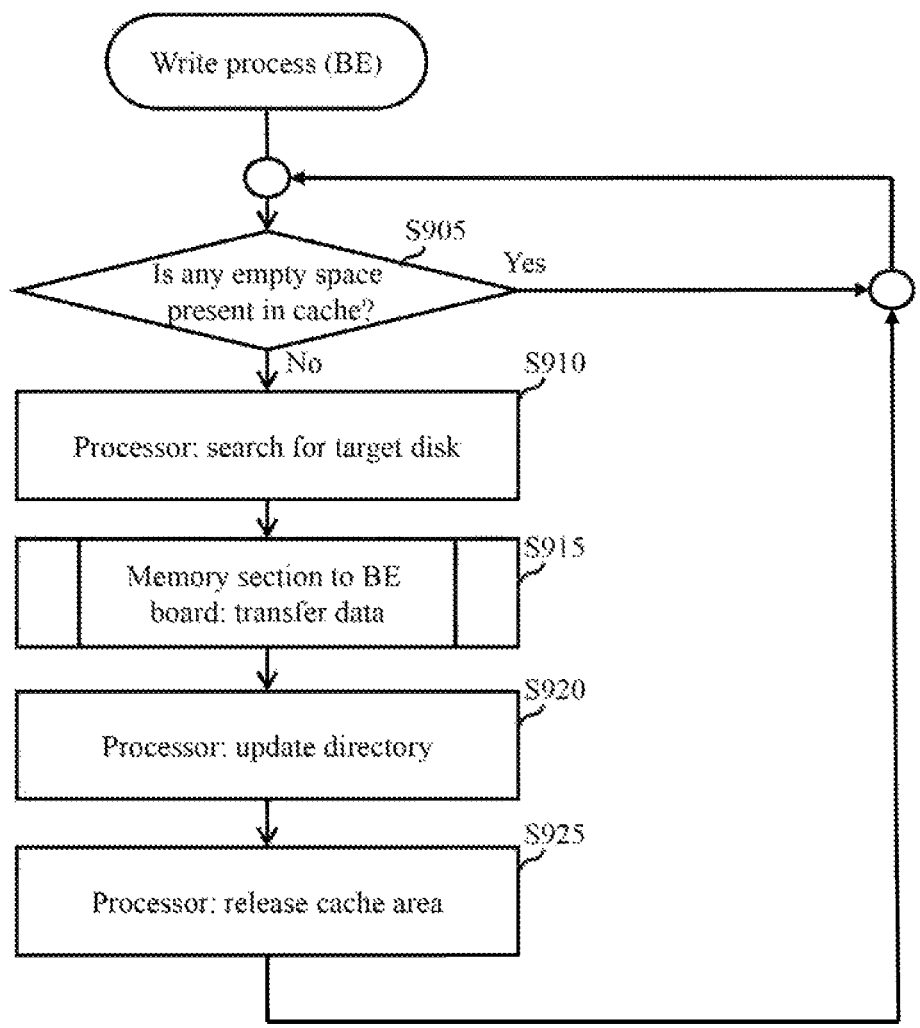
FIG. 10 is a flowchart showing a write process in a back end board.

FIG. 8, FIG. 9, and FIG. 10 are flowcharts showing a write process of writing write data from the host computer 105 to the cache memory 278C. First, the process will be described with reference to FIG. 8 and FIG. 10.

The host computer 105 issues a write command requesting writing of data to the storage system 100. The description below assumes that the write command includes write data. It is possible that the write command includes no write data. In this case, the host computer 105 first issues the write command to check the state of the storage system 100 and then transmits write data.

The protocol processing section 205 of the front end board 116 waits to receive a command from the host computer 105 (S705). Upon receiving the write command from the host computer 105 (S710), the protocol processing section 205 temporarily stores the received write command in the buffer 215 and then transfers the write command to the local memory 265 in the processor board 119.

The processor 260 in the processor board 119 reads the write command from the local memory 265 and analyzes the write command (S715). Based on the result of analysis of the write command, the processor 260 searches for a storage area to which the write data from the host computer 105 is to be written (S720).

Based on information indicative of the storage area to which the write data is to be written and directory information on the cache memory 278C stored in the control memory 278S, the processor 260 checks whether or not target data in a write request is stored in the cache memory 273C, that is, whether target data for update (hereinafter referred to as "update target data") is stored in the cache memory 278C (S725). The processor 260 transmits information indicating that the processor board is ready to transfer the write data, to the front end board 116 (S730).

Upon finding the update target data on the cache memory 278C (S735: Yes), the processor 260 transfers, to the protocol processing section 205 and the data transfer control section 210, information needed to transfer write data from the protocol processing section 205 to the cache memory 278C. Then, the processor 260 provides the protocol processing section 205 with an indication of the need to write the write data from the host computer 105 to the buffer (S745). The presence of the update target data on the cache memory 278C is referred to as a write hit.

The data transfer control section 210 of the front end board 116 reports the processor 260 that all of the write data received from the host computer 105 has been stored in the buffer 215 (S750). The processor 260 provides the data transfer control section 210 of the front end board 116 with an indication of the need to write the write data stored in the buffer 215 to the memory 278C (S755).

Upon receiving the indication, the data transfer control section 210 provides an indication of the need to start transferring the data to the cache memory 278C. The data transfer control section 210 transfers the write data from the buffer 215 to the cache memory 278C based on the information needed to transfer the data (S760). This data transfer process will be described in detail with reference to FIG. 9.

After writing the data to the cache memory 278C, the data transfer control section 210 reports the end of writing of the write data to the processor 260, having transmitted the indication. Upon detecting the end of writing of the data to the cache memory 278C, the processor 260 accesses the control memory 2788 to update the directory information on the cache memory 278C (S765). Specifically, the processor 260 records updating of the contents of the cache memory 278C in the directory information (S765).

The processor 260 provides the protocol processing section 205, having received the write command from the host computer 105, with an indication of the need to transmit a write completion report to the host computer 105 (S770). Upon receiving the indication, the protocol processing section 205 transmits the write completion report to the host computer 105 (S775).

Upon determining that no update target data is present on the cache memory 278C (S735: No), the processor 260 reserves an area in which the write data is to be stored, on the cache memory 278C (S740).

Specifically, the processor 260 accesses the control memory 278S and records, in the directory information on the cache memory 278C, predetermined information needed to reserve the area in which the write data is to be stored, on the cache memory 278C (S740). The predetermined information is information specifying an empty cache slot. The absence of the update target data on the cache memory 278C is referred to as a write miss.

After reserving the cache area, the storage system 100 carries out a process similar to the process carried out during a write hit as described above. However, in the case of a write miss, since no update target data is present on the cache memory 278C, the memory controller 276 stores the write data in the storage area reserved as a place in which the write data is to be stored.

The destage process will be described with reference to FIG. 10. The processor 260 determines, for example, a free space in the cache memory 278C (S905), and carries out a destage process for writing data written to the cache memory 278C in the memory to the disk 125, asynchronously with a write request from the host computer 105.

Specifically, the processor 260 accesses directory management information stored in the control memory 278S and searches for the back end board 117 to which the disk 125 allowing the storage of the data therein is coupled (S910). Subsequently, the processor 260 transmits information needed to transfer the data, to the protocol processing section 230 and data transfer control section 235 of the back end board 117.

Subsequently, the processor 260 provides the data transfer control section 235 and protocol processing section 230 of the back end board 117 with an indication of the need to read the data from the cache memory 278C and transfer the data to the disk 125.

Upon receiving the indication, the data transfer control section 235 transfers the data from the cache memory 278C to the buffer 240 in the back end board 117. Upon receiving the instruction, the protocol processing section 230 transfers the data from the buffer 240 to the disk 125 (S915).

As described above, when the host computer 105 writes write data to the storage system 100, the storage system 100 writes the write data to the cache memory 278C, and then writes the data from the cache memory 278C to the disk 125 using a predetermined trigger.

FIG. 9 is a flowchart showing a process of transferring data from the front end board 116 to the cache memory 278C. The present process represents step S760 in FIG. 8 in detail. Specifically, the front end board 116 (FE board 116) in FIG. 9 corresponds to the data transfer control section 210.

The data transfer control section 210 of the front end board 116 uses the DMA 220 to read the write data received from the host computer 105, from the buffer 215 (S805).

The data transfer control section 210 uses the dirty block flag addition section 225 to write the dirty block flag 425 into the guarantee code 420 in each of the data blocks 410 providing the write data (S810). The data transfer control section 210 transfers the write data with the dirty block flag added to each data block to the cache memory 278C for storage (S815).

The data transfer control section 210 determines whether all of the data indicated by the processor 260 has been transferred to the cache memory 278C. Upon determining that the transfer is complete (S820: Yes), the data transfer control section 210 ends the present process and returns to step S765 in FIG. 8.

Figure 11:
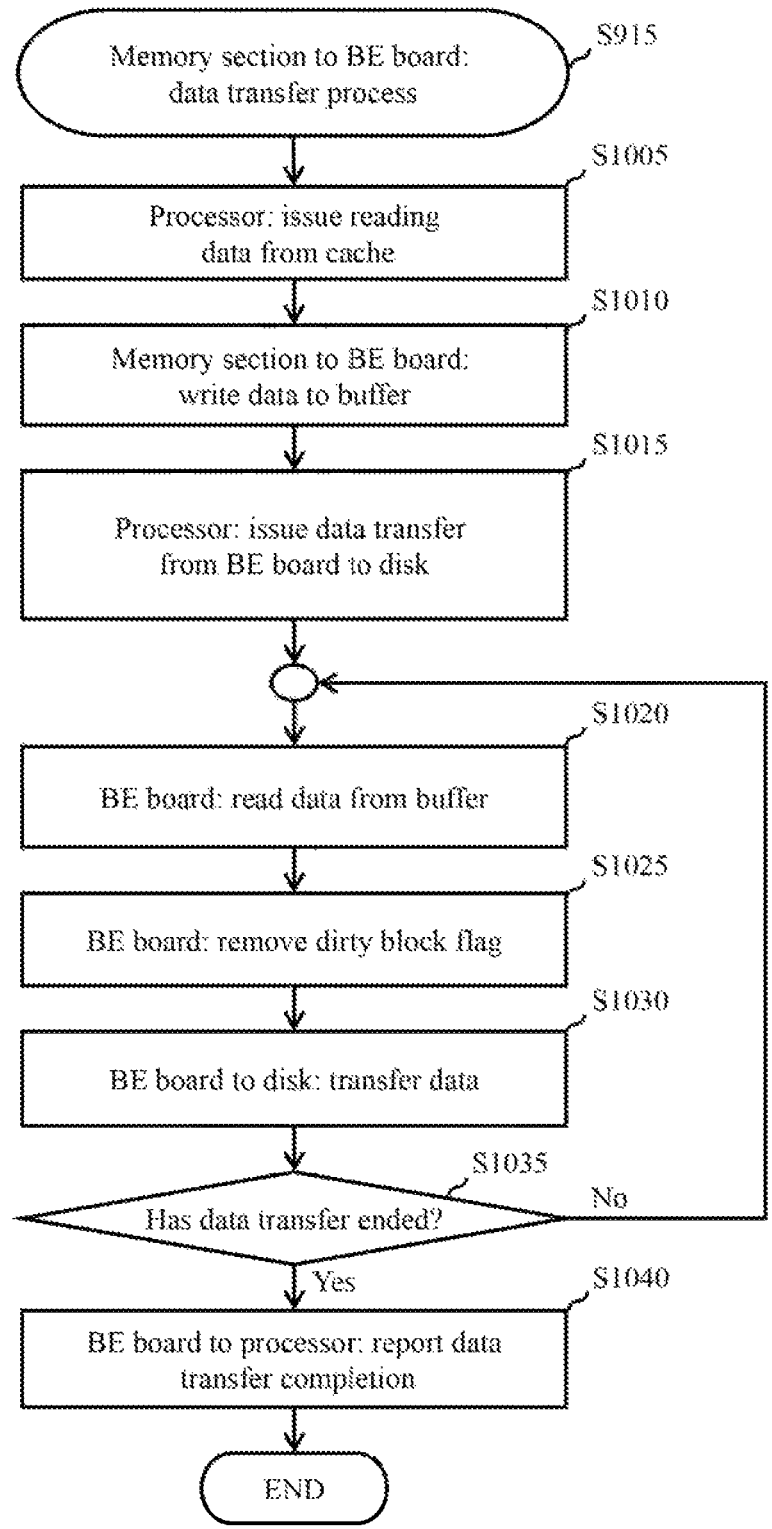
FIG. 11 is a flowchart showing a process in which the back end board writes data in the cache memory to a disk.

FIG. 11 is a flowchart showing a process of transferring data from the cache memory 278C to the disk 125. The present process represents step S915 in FIG. 10 in detail.

The processor 260 provides the data transfer control section 235 of the back end board 117 with an indication of the need to transfer data stored in the cache memory 278C to the buffer 240 (S1005). The data transfer control section 235 writes the data read from the cache memory 278C to the buffer 240 (S1010).

The processor 260 provides the protocol processing section 230 of the back end board 117 with an indication of the need to transfer the data from the buffer 240 to the disk 125 (S1015). The protocol processing section 230 reads the data (data blocks) stored in the buffer 240 (S1020).

The dirty block flag removal section 250 removes the dirty block flag added to each of the read data blocks (S1025). Specifically, for example, the bit of the dirty block flag is reset to 0.

The protocol processing section 230 transfers the data blocks from which the dirty block flag has been removed, to the disk 125 (S1030). When all of the data indicated in step S1015 has been transferred (S1035: Yes), the data transfer control section 230 reports the processor 260 that the data transfer is complete (S1040).

Figure 12:
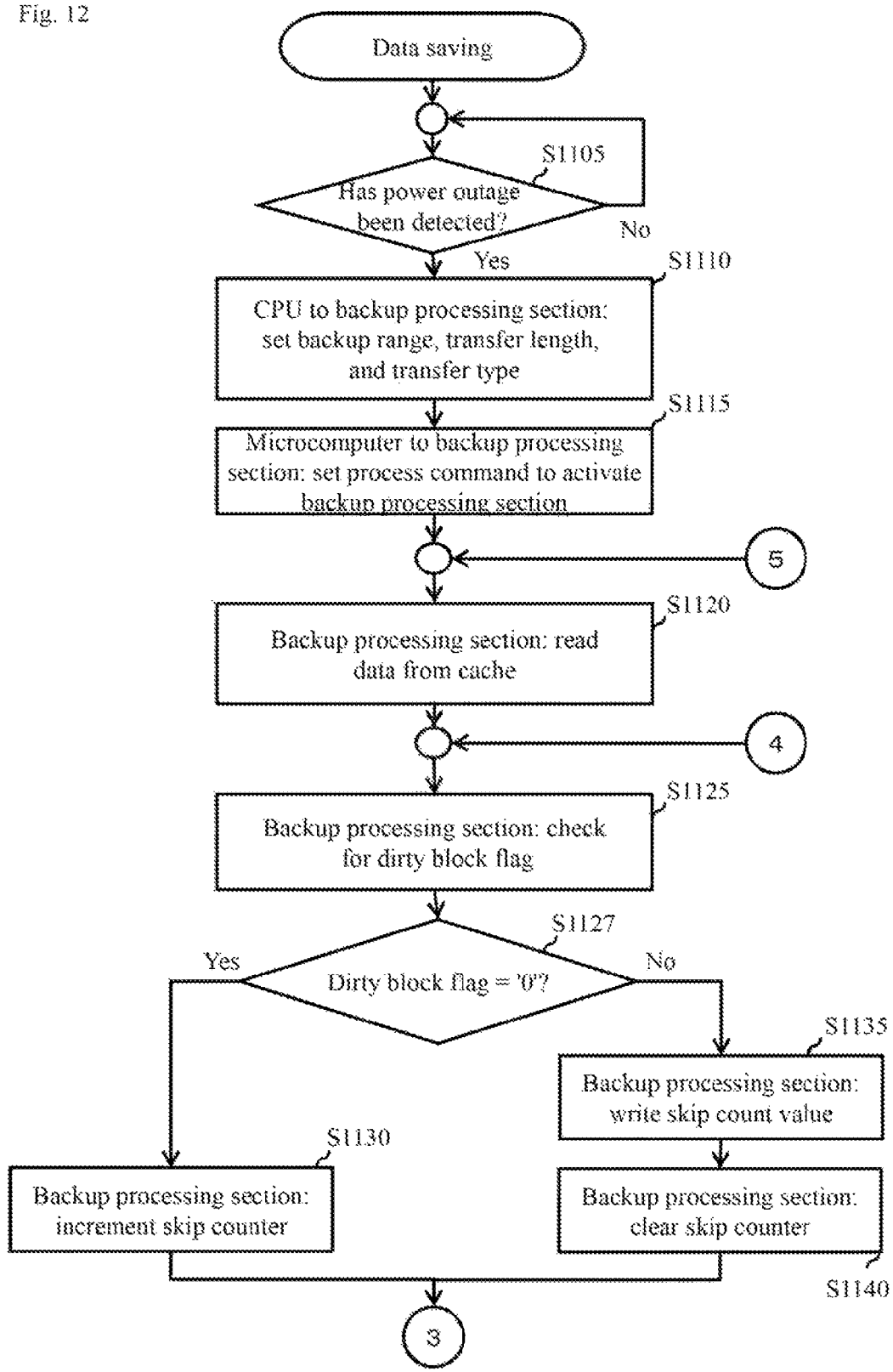
FIG. 12 is a flowchart showing a process of saving the data in the cache memory to the nonvolatile memory medium.
Figure 13:
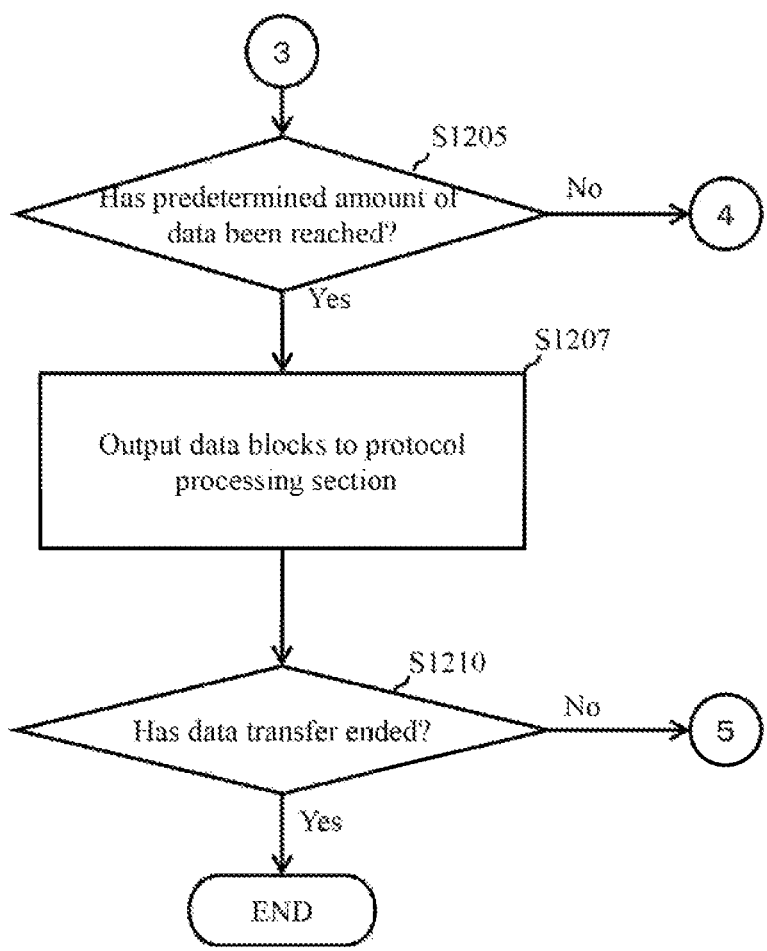
FIG. 13 is a flowchart continued from FIG. 12.

FIG. 12 and FIG. 13 are flowcharts showing a process of saving data (data blocks) stored in the cache memory 278C to the nonvolatile memory medium 284.

When a preset predetermined trigger such as power outage is detected (S1105), the microcomputer 280 in the memory board 118 configures predetermined data transfer parameters to be indicated to the backup processing section 282, in the control memory 305 in internal switch 274 (S1110). The predetermined data transfer parameters include a backup range, a transfer length, and a transfer type for the data stored in the cache memory 278C.

The microcomputer 280 configures a backup process command for the backup processing section 282 to activate the backup processing section 282 (S1115). The backup processing section 282 reads a range of data (data blocks) specified by the microcomputer 280 from the cache memory 278C (S1120). The backup processing section 282 checks whether the dirty block flag is added to each of the read data blocks (S1125).

Upon detecting a data block with the dirty block flag configured to 0 (S1127: Yes), the backup processing section 282 increments the skip counter 328 by one because the data block is a clean block (S1130).

Upon detecting a data block with the dirty block flag configured to a value other than 0 (S1127: No), the backup processing section 282 writes the value in the skip counter 328 to a register for storing skip counter information because the data block is a dirty block (S1135). Subsequently, the backup processing section 282 clears the skip counter 328 (S1140).

Further description will be given with reference to the flowchart in FIG. 13. When the data blocks with the dirty block flag added thereto have reached a predetermined data volume (S1205: Yes), the backup processing section 282 outputs the data to the protocol conversion section 320 (S1207). In other words, upon detecting a preset number of dirty blocks, the backup processing section 282 transfers the dirty blocks to the nonvolatile memory medium 284 via the protocol conversion section 320.

When the data blocks with dirty block flag have not reached the predetermined data volume (S1205: No), the backup processing section 282 returns to step S1125 in FIG. 12.

The backup processing section 282 determines whether all of the data within the range specified in step S1110 in FIG. 12 has been saved to the nonvolatile memory medium 284 (S1210). When the transfer of the saving target data from the cache memory 278C to the nonvolatile memory medium 284 finishes (S1210: Yes), the present process ends. Otherwise (S1210: No), the process returns to step S1120 in FIG. 12.

Figure 14:
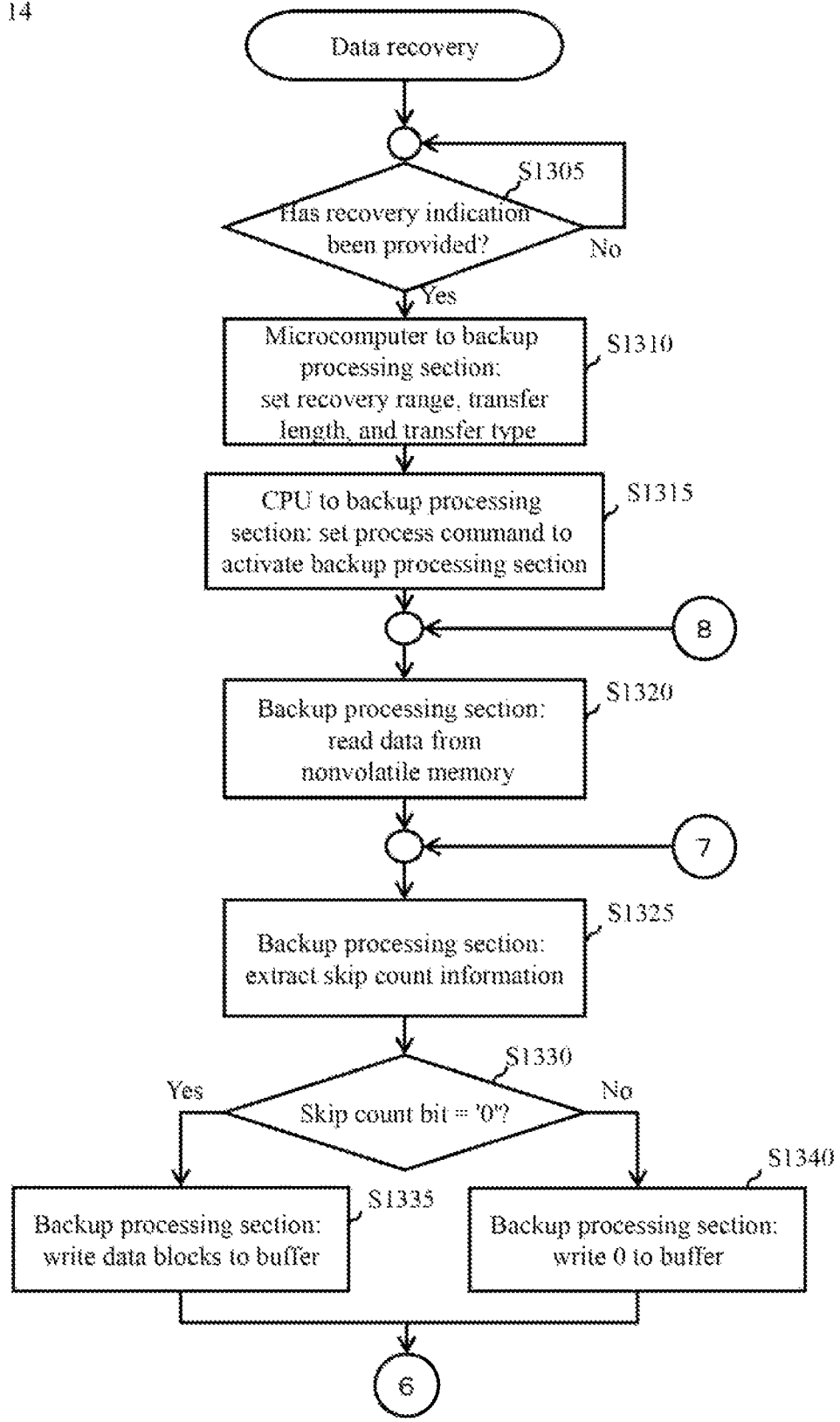
FIG. 14 is a flowchart showing a process of recovering the data on the cache memory based on the data saved to the nonvolatile memory medium.
Figure 15:
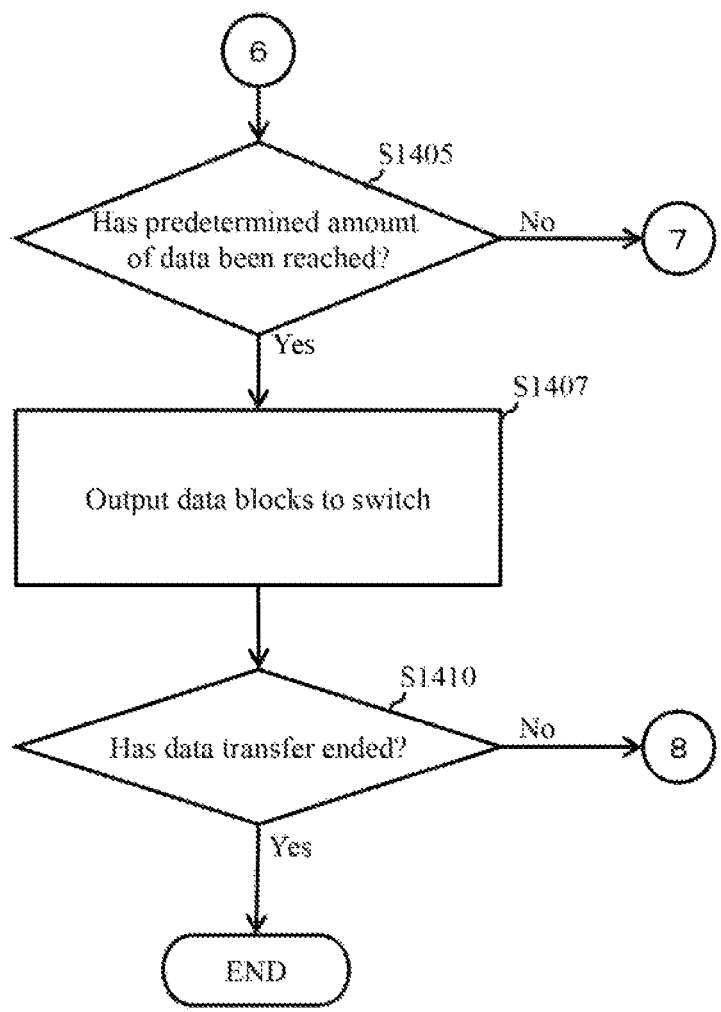
FIG. 15 is a flowchart continued from FIG. 14.

FIG. 14 and FIG. 15 are flowcharts showing a process of recovering data saved to the nonvolatile memory medium 284. A trigger to recover data blocks saved to the nonvolatile memory medium 234 to the cache memory 278C is a time point when the system is restored from power outage or the like.

Thus, in a situation where a recovery process is executable, a control program for controlling the storage controller 115 is running. Hence, the control program executed by the processor 260 provides the cache memory 278C with an indication of the need to recover the data blocks stored in the nonvolatile memory medium 284.

Upon receiving the indication of the need for recovery from the control program (S1305: Yes), the microcomputer 280 configures a recovery range, a transfer length, and a transfer type (S1310). The microcomputer 280 configures a process command for the backup processing section 282 to activate a recovery process (S1315).

The backup processing section 282 reads the data blocks within the specified recovery range from the nonvolatile memory medium 284 and further reads the skip count information 620 from the nonvolatile memory medium 284 (S1320).

As also described in FIG. 6, the backup processing section 282 extracts the skip count information (S1325). When the skip count is 0 (S1330: Yes), the backup processing section 282 stores the processing target data blocks in the buffer 332 because the processing target data blocks are dirty blocks (S1335).

In contrast, when the skip count is a value other than 0 (S1330: No), the value is indicative of the number of clean blocks. Thus, the backup processing section 282 stores a number of data blocks with 0 filled therein in the buffer 332 in accordance with the skip count (S1335).

Further description will be given with reference to FIG. 15. When the data blocks accumulated in the buffer 332 have reached a predetermined amount of data (S1405: Yes), the backup processing section 282 outputs the storage contents of the buffer 332 to the switch 274 (S1407). Otherwise (S1405: No), the backup processing section 282 returns to step S1325 in FIG. 14.

The backup processing section 282 determines whether all of the data within the range specified in step S1310 in FIG. 14 has been processed (S1410). When the recovery of the data from the nonvolatile memory medium 284 to the cache memory 278C is complete (S1410: Yes), the present process ends. Otherwise (S1410: No), the process returns to step S1320 in FIG. 14.

Figure 16:
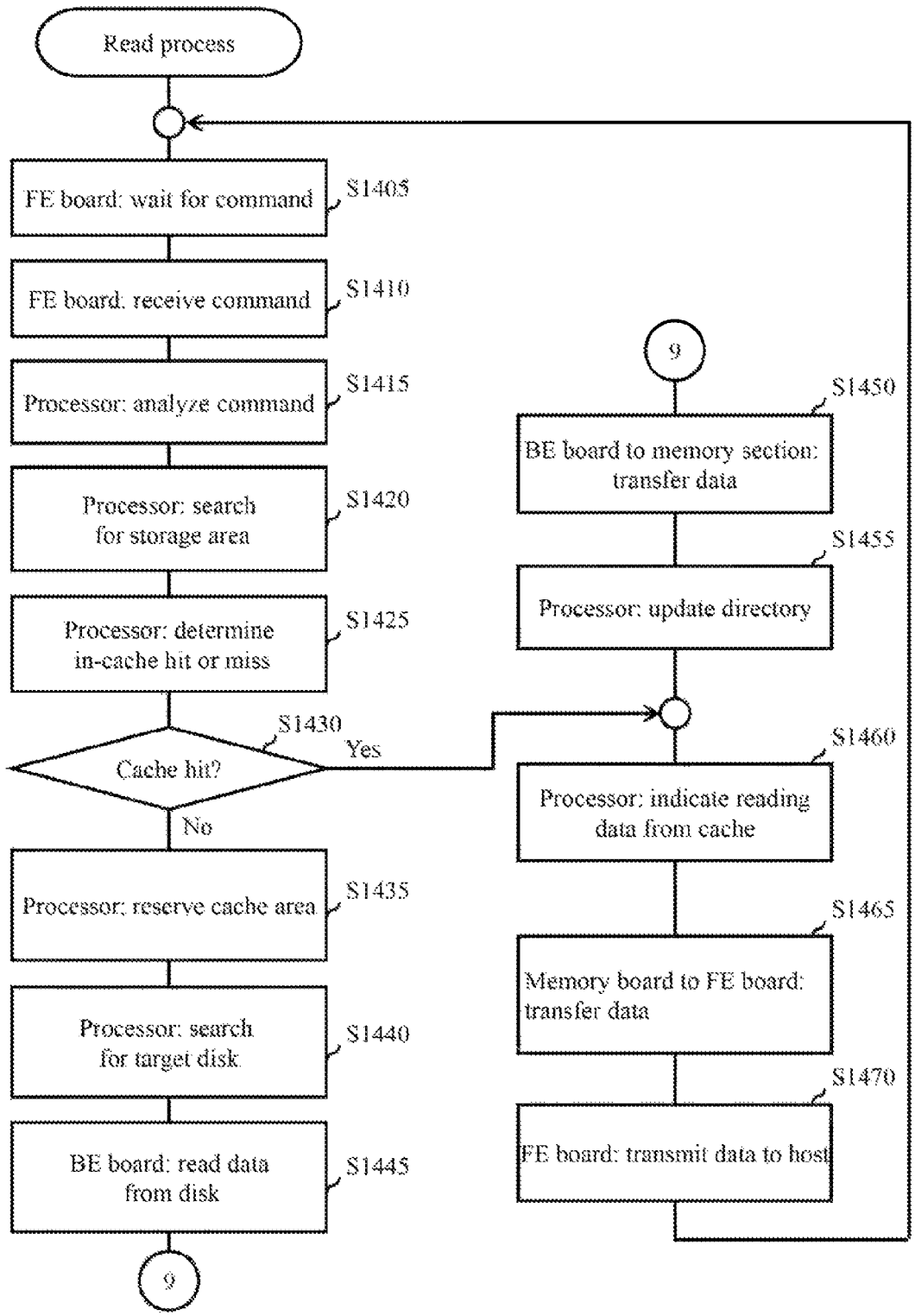
FIG. 16 is a flowchart showing a read process.

FIG. 16 is a flowchart showing a read process carried out when the host computer 105 reads data stored in the disk 125 in the storage system 100.

The host computer 105 issues a read command. The protocol processing section 205 of the front end board 116 waits to receive a command from the host computer 105 (S1405).

Upon receiving the read command from the host computer 105 (S1410), the protocol processing section 205 writes the received read command to the local memory 265 in the processor board 119 via the data transfer control section 210.

The processor 260 reads the read command from the local memory 265 and analyzes the write command (S1415). Based on the result of analysis of the read command, the processor 260 searches for information indicative of a storage area in which data requested by the host computer 105 is recorded (S1420).

Based on information indicative of the area where the data requested to be read is stored and the directory information on the cache memory 276C stored in the control memory 278S, the processor 260 checks whether or not the data requested to be read (read target data) is stored in the cache memory 278C (S1425).

The processor 260 determines whether or not a cache hit has occurred (S1430). The presence of the target data on the cache memory 278C is referred to as a cache hit. The absence of the target data on the cache memory 278C is referred to as a cache miss.

In the case of a cache hit (S1430: Yes), the processor 260 transmits information needed to transfer the read target data to the protocol processing section 205, to the protocol processing section 205 and the data transfer control section 210. The information needed to transfer the read target data includes the address of a read source where the read target data is stored (the address of the cache memory 278C) and the address of a transfer destination (the address of the buffer 215 in the front end board 116).

The processor 260 provides the data transfer control section 210 with an indication of the need to read the read target data from the cache memory 278C (S1460). Specifically, the processor 260 provides the data transfer control section 210 with an indication of the need to read the data requested by the host computer 105 from the cache memory 278C provided in the memory 278 in the memory board 118.

The data transfer control section 210 accesses the memory controller 276 in the memory board 118 to request the memory controller 276 to read the read target data from the cache memory 278C. The memory controller 276 reads the read target data from the cache memory 278C and transfers the read target data to the data transfer control section 210 of the front end board 116 (S1465). The protocol processing section 205 transmits the read target data read from the cache memory 278C, to the host computer 105 (S1470).

On the other hand, upon determining that a cache miss has occurred (S1430: No), the processor 260 accesses the control memory 278S and records, in the directory information on the cache memory 278C, information needed to reserve an area in the cache memory 278C where the read target data is to be stored (S1435). Specifically, the processor 260 records information specifying an empty cache slot in the directory information.

After reserving an empty area on the cache memory 278C, the processor 260 searches for the disk 125 with the read target data stored therein (S1440). Specifically, the processor 260 uses storage area management information stored in the control memory 278S to detect the back end board 117 to which the disk 125 allowing storage of the read target data therein is coupled.

The processor 260 writes, to the buffer memory 240, a command and information needed to transfer the read target data from the back end board 117 to the cache memory 278C. The processor 260 provides the protocol processing section 230 with an indication of the need to read the read target data from the disk 125 and transfer the read target data to the cache memory 278C.

Based on the indication from the processor 260, the protocol processing section 230 reads the read target data from the disk 125 (S1445) and writes the read target data to the buffer memory 240. The data transfer control section 230 issues a data write request to the memory board 118. Moreover, the data transfer control section 230 transfers every predetermined set of data read from the disk 125 (read target data), to the cache memory 278C.

The memory controller 276 writes the received read target data to the cache memory 278C (S1450). When the writing of the read target data ends, the memory controller 276 reports the end of the writing to the data transfer control section 235 and the processor 260.

The processor 260 accesses the control memory 278S to update the directory information on the cache memory 278C. Specifically, the processor 260 records the updating of the contents of the cache memory 278C in the directory information (S1455).

Moreover, the processor 260 writes, to a predetermined place in the control memory 278J, an indication of the need for the front end board 116, having transmitted the read command, to read the read target data from the cache memory 278C (S1460).

The data transfer control section 210 of the front end board 116 polls the predetermined place in the control memory 278S to check whether the information has been written to the place. When the indication from the processor 260 is written to the control memory 278S, the data transfer control section 210 reads the instruction.

Upon receiving the indication, the data transfer control section 210, as is the case with the process procedure carried out for a cache hit, reads the read target data from the cache memory 278C (S1465) and transfers the read target data to the host computer 105 (S1470). As described above, the storage system 100 reads the read target data from the cache memory 278C or the disk 125 and transmits the read target data to the host computer 105, in accordance with a data read request from the host computer 105.

The present embodiment configured as described above exerts the following effects. According to the present embodiment, write data received from the host computer 105 is divided into data blocks 410 each of a predetermined size, and the dirty block flag 425 for controlling data saving is configured for each data block. Thus, the present embodiment allows determination of whether or not each data block can be saved to nonvolatile memory medium 284 and whether or not each data block can be restored to the cache memory 278C.

The present embodiment allows only data that needs to be backed up (dirty data) to be saved, enabling a reduction in time needed for backup. The present embodiment, which enables a reduction in backup time, eliminates the need to provide large-capacity batteries. The present embodiment allows a reduction in management time as a result of the reduced backup time and prevents an increase in battery cost, thus enabling a reduction in costs needed for data management.

The present embodiment allows only the data needed for backup to be saved. As a result, restore time can also be reduced.

According to the present embodiment, the dirty block flag 425 is configured in the guarantee code 420 added to the data section 415. Thus, the backup processing section 282 can determine whether or not to save the data and whether or not to recover the data by analyzing only the processing target data blocks 410 without referencing the directory information. The backup processing section 282 can determine whether or not the process can be achieved by using only the dirty block flag configured in the data blocks. Thus, the backup processing section 282 can quickly determine whether or not saving can be achieved and whether or not recovery can be achieved.

According to the present embodiment, the skip counter 328 is provided in the backup processing section 282. When data blocks that are not saving targets (clean blocks) are detected, the number of the data blocks is counted. When a saving target data block (dirty block) is detected, the count value is reset. Then, the skip count information is stored in the nonvolatile memory medium 284 in association with a predetermined amount of dirty blocks. Thus, during data recovery, the data can be quickly recovered by filling the gap between dirty blocks with 0 data based on the skip count information.

On the other hand, the gap between dirty blocks need not necessarily be filled with 0 data. It is possible that only the corresponding block is read from the disk based on the skip count information to restore the clean data. In this case, the state present at the time of the saving is reproduced, and thus, the cache hit rate is expected to improve after the restoration.

In contrast, a configuration is possible in which, for example, information on the location of each data block on the cache memory 278C is stored in the guarantee code in the data block. The use of the location information allows dirty blocks to be returned to the original locations thereof on the cache memory 278C. However, in that case, the size of the data block is increased by an amount equivalent to the location information.

According to the present embodiment, the number of data blocks that are not saving targets is detected during data saving and stored in association with a predetermined amount of dirty blocks, as described above. Consequently, the present embodiment enables a reduction in skip count information 620, which is information for controlling the recovery process, thus allowing the data to be accurately and quickly recovered.

Second Embodiment

A second embodiment will be described using FIG. 17 to FIG. 22. The embodiments described below including the present embodiment correspond to variations of the first embodiment. Thus, differences from the first embodiment will mainly be described. The present embodiment uses no ASIC (Application Specific Integrated Circuit) and carries out processes such as data saving and data recovery based on software processing executed by a processor 260.

Figure 17:
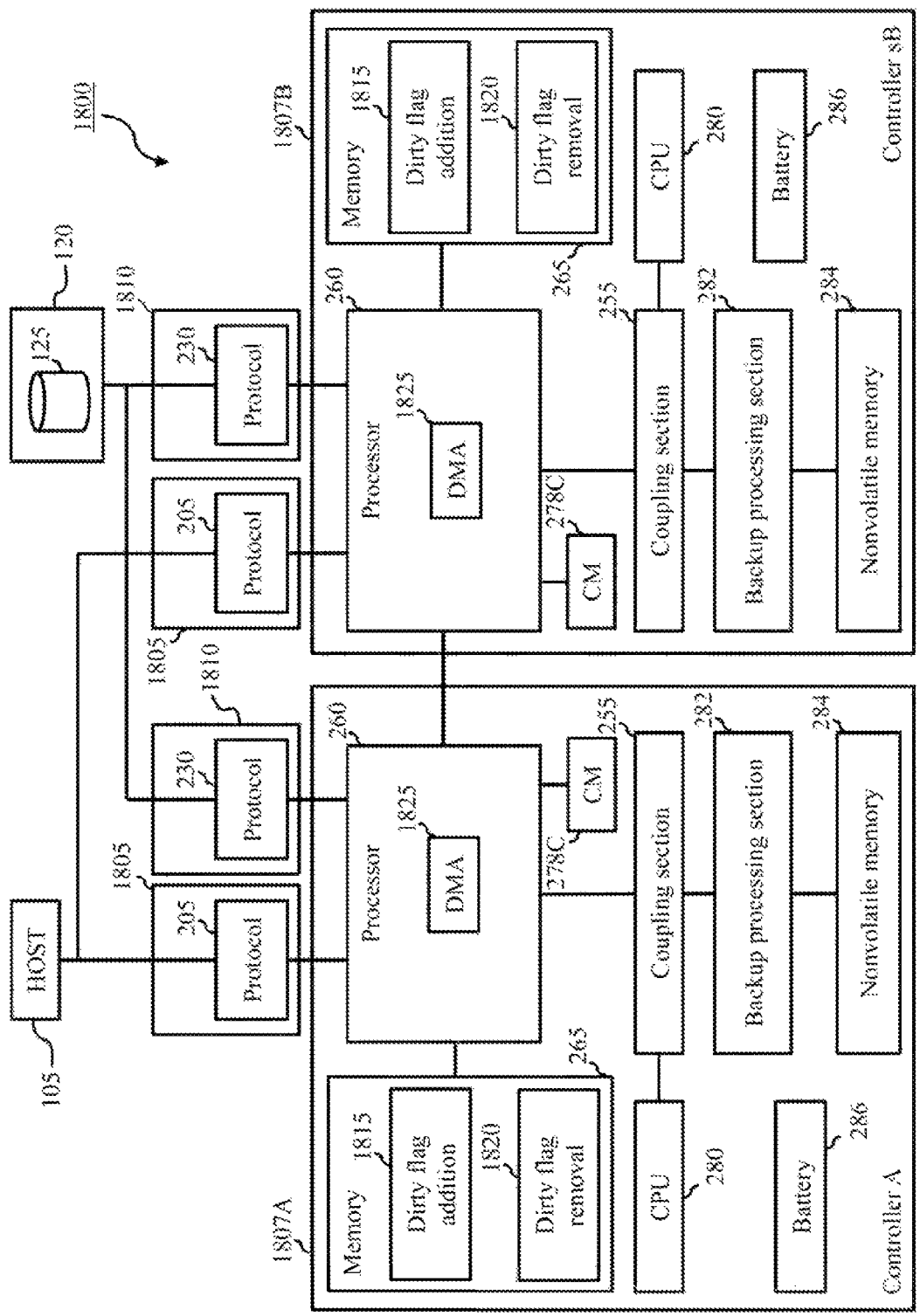
FIG. 17 is a block diagram of a storage system according to a second embodiment.

FIG. 17 is an example of a configuration of a storage system 1800 according to the present embodiment. The storage system 1800 has a host computer 105, storage controllers 1807A and 1807B, a disk enclosure 120, and a disk 125 as is the case with the first embodiment. The system except for the host computer 105 may be referred to as the storage system 1800.

The present embodiment includes the plurality of storage controllers 1807A and 1807B. A processor 260 in one of the storage controllers 1807A and a processor in the other storage controller 18078 are coupled together so as to be able to communicate with each other.

Each of the storage controllers 1807A and 1807B is configured as a cluster and coupled to the host computer 105 and the disk 125. The cluster configuration enables loads to be distributed between the storage controllers 1807A and 1807B, allowing possible degradation of response performance to be suppressed. Moreover, if a failure occurs in one of the storage controllers, the cluster configuration allows a normal storage controller to continue processing. This makes the storage system more reliable. The storage controllers 1807A and 1807B are hereinafter referred to as the storage controller 1807 when the storage controllers 1807A and 1807B are not particularly distinguished from each other.

Instead of the cluster configuration, a configuration is possible in which, for example, one of the storage controllers 1807A serves to communicate with the host computer 105, whereas the other storage controller 1807B serves to communicate with the disk 125.

In the storage controller 115 according to the first embodiment, a data transfer control section 210 is provided in a front end board 116, and a data transfer control section 235 is provided in a back end board 117. According to the first embodiment, the data transfer control section 210 in the front end board 116 adds the dirty block flag to a data block, and the data transfer control section 235 in the back end board 117 removes the dirty block flag.

The storage controller 1807 according to the present embodiment couples to a front end interface module 1805 corresponding to the front end board 116 from which the data transfer control section 210 and a buffer memory 215 are removed, and a back end interface module 1810 corresponding to the back end board 117 from which the data transfer control section 235 and a buffer memory 240 are removed.

The storage controller 1807 communicates with the host computer 105 via the front end interface module 1805. The storage controller 1807 communicates with each the disks 125 in the disk enclosure 120 via the back end interface module 1810.

The processor 260 executes the dirty block flag addition function and the dirty block flag removal function, provided in the data transfer control sections 210 and 235 according to the first embodiment.

The memory 265, used by the processor 260, stores a dirty block flag addition process module 1815 for adding the dirty block flag to a data block and a dirty block flag removal process module 1820 for removing the dirty block flag from the data block.

Upon receiving write data from the host computer 105, the processor 260 invokes the dirty block flag addition process module 1815 from the memory 265 for use. To write a data block to the disk 125, the processor 260 invokes the dirty block flag removal module 1820 from the memory 265 for use.

The processor 260 has a DMA 1825. The DMA 1825 implements a data transfer function inside the processor 260. For example, the DMA 1825 is used, for example to copy data blocks stored in the memory 265 to the memory 265 used by the processor 260 in the other controller 1807B.

The processor 260 is coupled to a backup processing section 282 and a microcomputer 280 via a coupling mechanism 255 (coupling section 255 in the figures). The backup processing section 282 is coupled to a nonvolatile memory medium 284. Furthermore, the processor 260 couples to a cache memory 278C. In a possible configuration, the cache memory 278C is provided in the memory 265.

Figure 18:
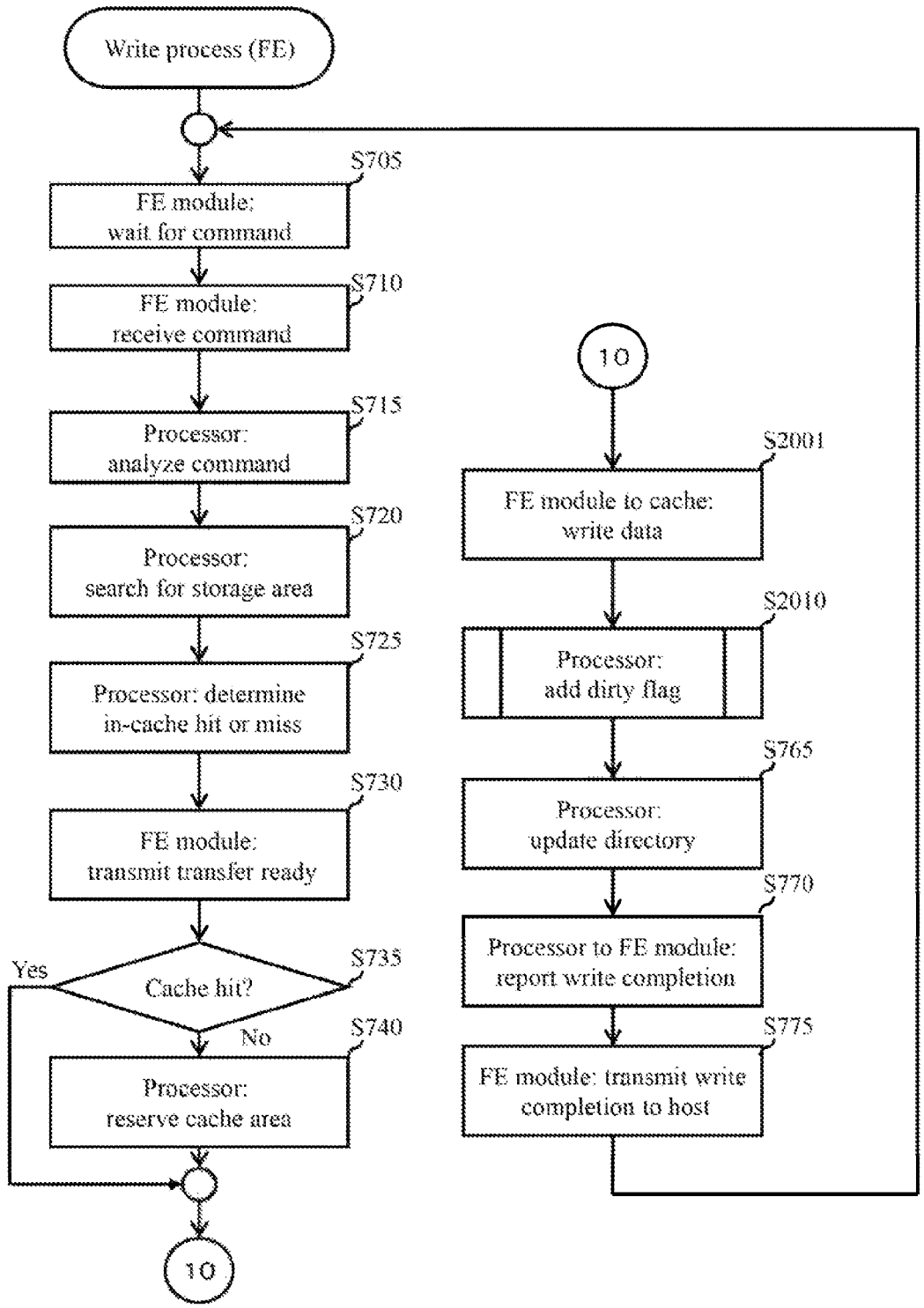
FIG. 18 is a flowchart of a write process.

FIG. 18 is a flowchart showing a write process of writing write data received from the host computer 105 to the cache memory.

In the write process according to the present embodiment, the front end interface module 1805 includes no buffer memory. Thus, the write process according to the present embodiment differs from the write process in the flowchart described with reference to FIG. 8 in, for example, process steps related to the buffer memory.

Steps S705 to S740 are similar to steps S705 to S740 described with reference to FIG. 8. However, in the present process, the processor 260 writes data blocks from the front end interface module 1805 to the cache memory 278C after step S740 (S2001).

The processor 260 carries out a process of adding the dirty block flag to each of the data blocks (S2010). The dirty block flag addition process will be described using FIG. 19. Subsequent steps S765 to S775 are the same as steps S765 to S775 according to the first embodiment and will thus not be described.

Figure 19:
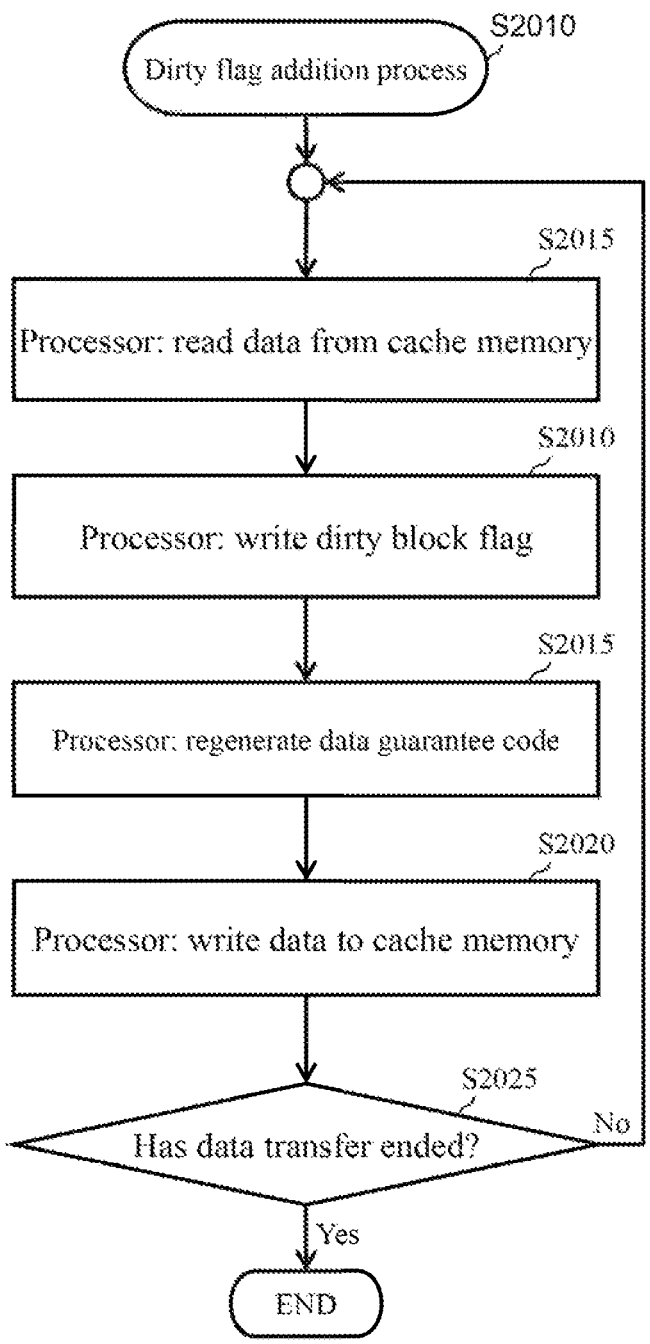
FIG. 19 is a flowchart of a process of adding a dirty block flag to a data block.

FIG. 19 is a flowchart showing a procedure for the dirty block flag addition process according to the second embodiment of the present invention.

The processor 260 reads data blocks from the cache memory 278C (S2015). The processor 260 writes the dirty block flag to each of the data blocks read in step S2015 (S2010). The processor 260 regenerates a data guarantee code (for example, a CRC) (S2015). To allow the dirty block flag to be added to the data block, the guarantee code for guaranteeing the reliability of the data block needs to be generated.

The processor 260 writes each data block to the cache memory 278C along with the dirty block flag and the regenerated data guarantee code (S2020). Upon completing adding the dirty block flag to all the data blocks to be processed (S2025: Yes), the processor 260 ends the present process. Otherwise (S2025: No), the processor 260 returns to step S2015.

Figure 20:
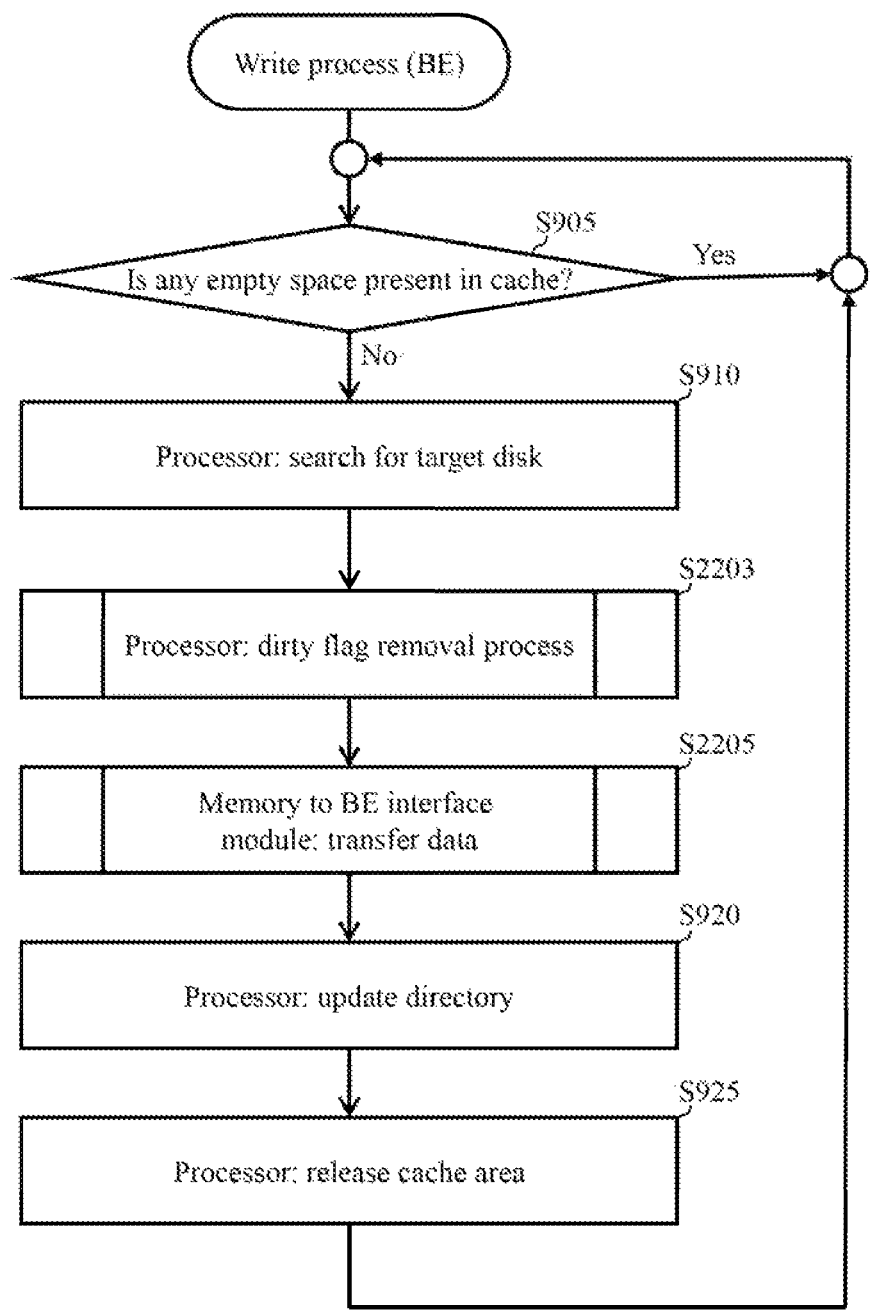
FIG. 20 is a flowchart showing a process of transferring data from a cache memory to a disk.

FIG. 20 is a flowchart showing a process of transferring data from the cache memory 278C to the disk 125.

The present process is basically similar to the process described with reference to FIG. 10 except in the following regards. First, data read from the cache memory 278C is transferred to the back end interface module 1810 (S2205). Second, before step S2205, a dirty block flag removal process (S2203) is carried out by the processor 260. The other steps S920 and S925 are similar to the corresponding steps in FIG. 10. The dirty block flag removal process will be described below with reference to FIG. 21. A data transfer process in step S2205 will be described with reference to FIG. 22.

Figure 21:
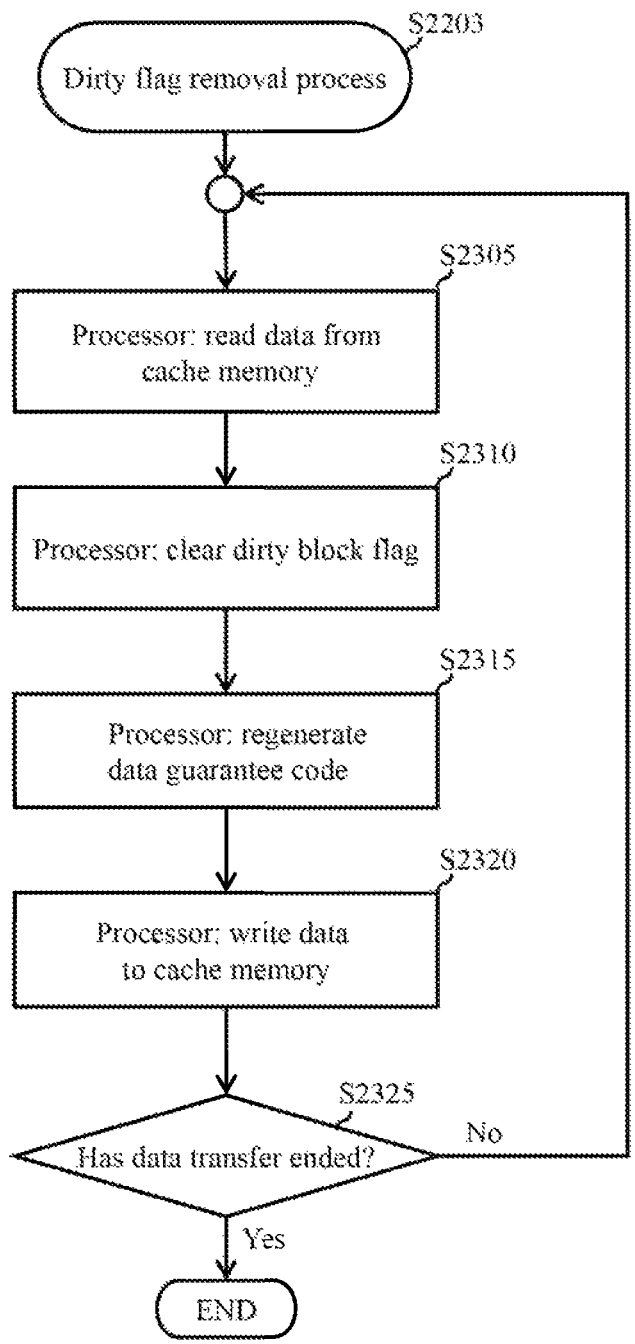
FIG. 21 is a flowchart of a process in which a processor removes the dirty block flag from the data block.

FIG. 21 is a flowchart showing a process in which the processor 260 removes the dirty block flag from a data block.

The processor 260 reads data blocks from the cache memory 278C (S2305). The processor 260 clears the dirty block flag configured for each of the data blocks read in step S2305 (S2310). The processor 260 regenerates a data guarantee code (for example, a CRC) (S2315). In step S2310, to allow the dirty block flag to be cleared, the guarantee code for guaranteeing the reliability of the data block needs to be generated again.

The processor 260 writes each data block to the cache memory 278C along with the dirty block flag and the regenerated data guarantee code (S2320). Upon removing the dirty block flag from all the data blocks to be processed (S2325: Yes), the processor 260 ends the present process. Otherwise (S2325: No), the processor 260 returns to step S2015.

Figure 22:
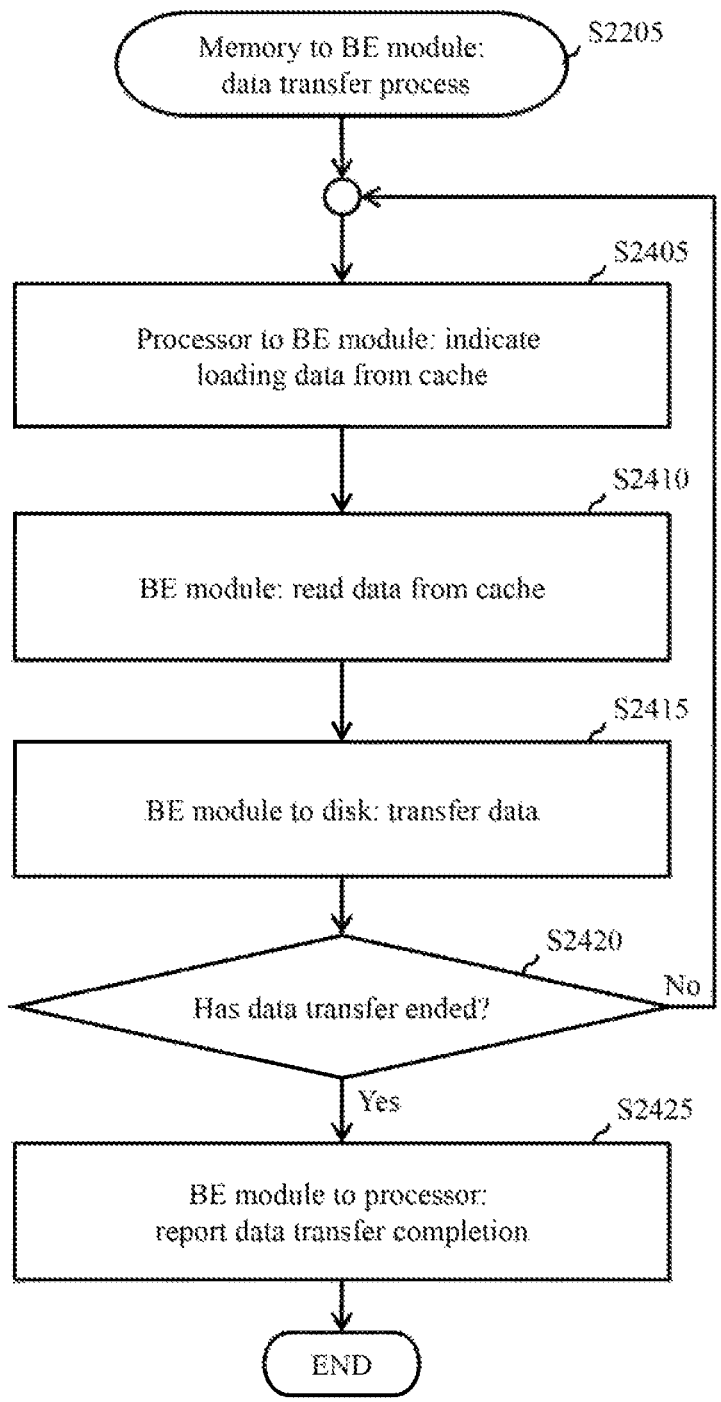
FIG. 22 is a flowchart showing a process of transferring data from a cache memory 278C to a disk 125.

FIG. 22 is a flowchart showing a process of transferring data from the cache memory 278C to the disk 125.

The processor 260 provides the back end interface module 1810 with an indication of the need to load the data stored in the cache memory 278C (S2405). The protocol processing section 230 of the back end interface module 1810 reads the data stored in the cache memory 278C in accordance with the indication from the processor 260 (S2410).

The backup end interface module 1810 transfers the data read in step S2410 to the disk 125 (S2415). Upon finishing the transfer of all the indicated data to the disk 125 (S2420: Yes), the protocol processing section 230 of the back end interface module 1810 reports the completion of the data transfer to the processor (S2425). The protocol processing section 230 ends the present process. Otherwise (S2420: No), the protocol processing section 230 returns to step S2405.

The present embodiment configured as described above exerts effects similar to the effects described in the first embodiment. The present embodiment omits the dedicated circuit for adding the dirty block flag and the dedicated circuit for removing the dirty block flag. Instead, the present embodiment allows the dirty block flag to be added to and removed from a data block based on software processing carried out by the processor 260. This enables a reduction in hardware circuit, allowing the configuration of the storage controller to be simplified.

Third Embodiment

Figure 23:
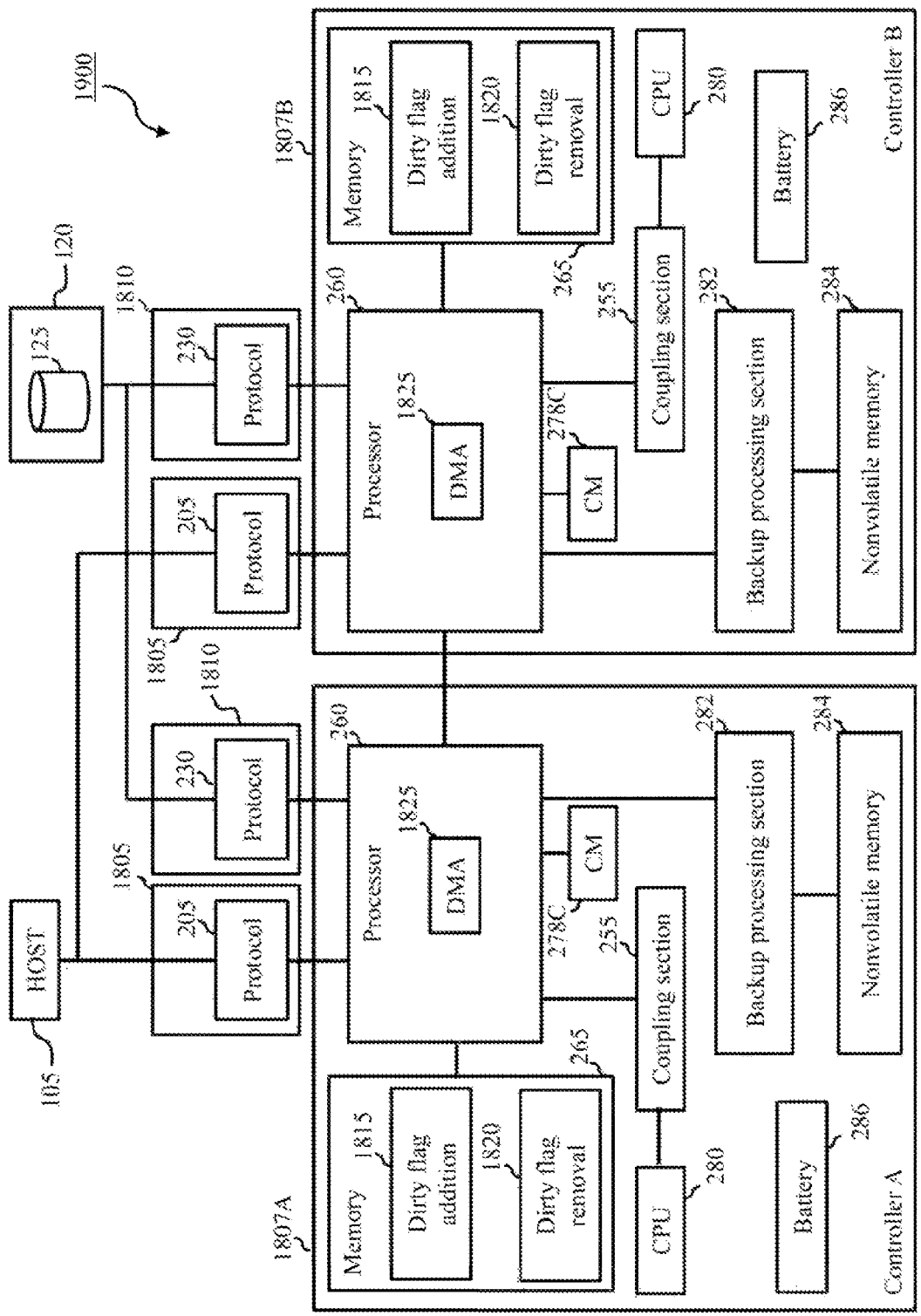
FIG. 23 is a block diagram of a storage system according to a third embodiment.

A third embodiment will be described with reference to FIG. 23. The present embodiment also omits the dedicated circuits and allows the processor 260 to serve to carry out processes of adding and removing the dirty block flag.

A storage system 1900 according to the present embodiment has a host computer 105, a storage controller 1807, a disk enclosure 120, and a disk 125. The third embodiment differs from the second embodiment in a coupling form of a backup processing section 282. The remaining part of the configuration of the third embodiment is the same as the corresponding part of the configuration of the second embodiment. According to the present embodiment, the backup processing section 282 is coupled to a processor 260 without an intervening coupling mechanism 255.

The present embodiment configured as described above exerts effects similar to the effects described in the second embodiment. According to the present embodiment, the processor 260 is coupled directly to the backup processing section 282. This allows a data saving process and a data recovery process to be carried out more quickly than in the above-described second embodiment.

The present invention is not limited to the above-described embodiments but includes many variations. For example, the subject adding or removing the dirty block flag to or from a data block is the data transfer control section according to the first embodiment and is the processor according to the second embodiment. Alternatively, the subject may be the protocol processing section.

Furthermore, the unit for addition of the dirty block flag may be either a segment including a plurality of blocks or a unit called slot including a plurality of segments as shown in FIG. 4. Increasing the size of the unit for addition of the dirty block flag enables a reduction in the time needed for the data saving process and the data recovery process. Furthermore, the data guarantee code may be regenerated as necessary in connection with the addition or removal of the dirty block flag.

The embodiments are described in detail in order to make the present invention easy to understand, and are not limited to the above-described embodiments with complete sets of components. A part of configuration of one embodiment may be replaced with the configuration of another embodiment. The configuration of one embodiment may be added to the configuration of another embodiment. A part of configuration of each embodiment may undergo addition of another configuration, deletion, or replacement.

Some or all of the above-described configurations, functions, processing sections, processing means, and the like may be implemented by hardware by, for example, being designed using integrated circuits. Alternatively, the above-described configurations, functions, and the like may be implemented by software by interpreting and executing programs that implement the functions.

For example, a configuration is possible in which hardware processing and software processing cooperate with each other; a dedicated hardware circuit adds the dirty block flag to each data block, and a computer program operating on the processor 260 removes the dirty block flag from each dirty block.

Information such as a program, a table, or a file which allows each function to be implemented may be placed in a storage apparatus such as a memory, a hard disk, or an SSD (Solid State Drive) or a storage medium such as an IC card, an SD card, or a DVD.

Furthermore, control lines and information lines are illustrated which are considered to be necessary for description. Not all of the control lines and the information lines on a corresponding product are illustrated. In actuality, approximately all configurations may be considered to be coupled together.

REFERENCE SIGNS LIST

100, 1800, 1900 Storage system
105 Host computer
115, 1807 Storage controller
125 Disk
225, 1815 Dirty block flag addition section
250, 1820 Dirty block flag removal section
278C Cache memory
284 Nonvolatile memory medium

The invention claimed is:

1. A storage system coupled to a host computer, comprising:
   a storage apparatus configured to store data written by a host computer; and
   a storage controller configured to control the storage apparatus,
   the storage controller including a microprocessor, a cache memory used by the microprocessor, and a nonvolatile memory coupled to the cache memory,
   wherein the storage controller is configured to:
   add a predetermined flag to every predetermined size of data requested by the host computer to be written to the storage system, and store the data in the cache memory;
   transfer data with the predetermined flag added thereto out of the data stored in the cache memory to the nonvolatile memory for storage when the storage controller detects a preset predetermined trigger for saving; and
   detect, as unsaved data information, a data size and a storage location for data with no predetermined flag added thereto out of the data stored in the cache memory, and transfer the detected unsaved data information to the nonvolatile memory so that the unsaved data information is stored in the nonvolatile memory in association with the data with the predetermined flag added thereto.

2. The storage system according to claim 1, wherein the storage controller is configured to, when recovering the data saved to the nonvolatile memory, transfer the data with the predetermined flag added thereto from the nonvolatile memory to the cache memory for storage, and further writes data filled with a predetermined value to the cache memory at the storage location and with the data size, based on the unsaved data information.

3. The storage system according to claim 2, wherein the predetermined flag indicates that data on the cache memory is in a dirty state in which the data is not stored in the storage apparatus.

4. The storage system according to claim 3, wherein the storage controller is configured to add the predetermined flag to every predetermined size of the data requested by the host computer to be written to the storage system when the storage controller stores the data in the cache memory.

5. The storage system according to claim 4, wherein the storage controller is configured to remove the predetermined flag when storing the data stored in the cache memory in the storage apparatus.

6. The storage system according to claim 5, wherein the storage controller is configured to divide the data requested by the host computer to be written to the storage system into data blocks of the predetermined size, and add predetermined redundant data to each of the data blocks, the predetermined flag being included in the redundant data.

7. The storage system according to claim 6, wherein the redundant data is a guarantee code guaranteeing that data in the data block is correct data and indicating a logical block address of the data block, and the guarantee code contains a predetermined bit for configuring the predetermined flag.

8. The storage system according to claim 6, wherein the storage controller includes a host side communication interface section configured to transmit and receive data to and from the host computer, and
   a flag addition section configured to add the predetermined flag to the data requested by the host computer to be written to the storage system is configured as a hardware circuit and provided in the host side communication interface section.

9. The storage system according to claim 5, wherein the storage controller includes an apparatus side communication interface section configured to transmit and receive data to and from the storage apparatus, and
   a flag removal section configured to remove the predetermined flag from the data to be stored in the storage apparatus is configured as a hardware circuit and provided in the apparatus side communication interface section.

10. The storage system according to claim 1, wherein a flag addition section configured to add the predetermined flag to the data requested by the host computer to be written to the storage system is implemented as a predetermined computer program operating on the microprocessor.

11. The storage system according to claim 5, wherein a flag removal section configured to remove the predetermined flag from the data to be stored in the storage apparatus is implemented as another predetermined computer program operating on the microprocessor.

12. The storage system according to claim 1, wherein the storage controller includes, as a hardware circuit, a backup processing section provided between the cache memory and the nonvolatile memory and configured to carry out a predetermined backup process, and the backup processing section is configured to carry out the predetermined backup process by:

transferring the data with the predetermined flag added thereto out of the data stored in the cache memory to the nonvolatile memory for storage; and detecting, as unsaved data information, a data size and a storage location for data with no predetermined flag added thereto out of the data stored in the cache memory, and transferring the detected unsaved data information to the nonvolatile memory so that the unsaved data information is stored in the nonvolatile memory in association with the data with the predetermined flag added thereto.

13. The storage system according to claim 12, wherein the backup processing section is further configured to carry out the predetermined backup process by:

transferring the data with the predetermined flag added thereto from the nonvolatile memory to the cache memory for storage, and further writing data filled with a predetermined value to the cache memory at the storage location and with the data size, based on the unsaved data information, when recovering the data saved to the nonvolatile memory.

14. A data management method for allowing a storage system to manage data from a host computer, the storage system including a storage apparatus configured to store data written by a host computer, and a storage controller configured to control the storage apparatus, the storage controller including a microprocessor, a cache memory used by the microprocessor, and a nonvolatile memory coupled to the cache memory, wherein the storage controller:

adds a predetermined flag to every predetermined size of data requested by the host computer to be written to the storage system, and stores the resultant data in the cache memory;

transfers data with the predetermined flag added thereto out of the data stored in the cache memory to the nonvolatile memory for storage when the storage controller detects a preset predetermined trigger for saving; and detects, as unsaved data information, a data size and a storage location for data with no predetermined flag added thereto out of the data stored in the cache memory, and transfers the detected unsaved data information to the nonvolatile memory so that the unsaved data information is stored in the nonvolatile memory in association with the data with the predetermined flag added thereto.

* * * * *